(12) United States Patent
Park et al.

(10) Patent No.: US 11,460,732 B2
(45) Date of Patent: Oct. 4, 2022

(54) LIGHT PATH CONTROL ELEMENT, BACKLIGHT UNIT AND DISPLAY DEVICE

(71) Applicant: LG Display Co., Ltd., Seoul (KR)

(72) Inventors: MyungJoon Park, Paju-si (KR); JaeHo Lee, Paju-si (KR); GwanHoon Park, Paju-si (KR); Kyuhwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 52 days.

(21) Appl. No.: 17/094,417

(22) Filed: Nov. 10, 2020

(65) Prior Publication Data

US 2021/0165277 A1 Jun. 3, 2021

(30) Foreign Application Priority Data

Nov. 28, 2019 (KR) .................. 10-2019-0155204

(51) Int. Cl.
*G02F 1/13357* (2006.01)
*G02F 1/1335* (2006.01)

(52) U.S. Cl.
CPC .. *G02F 1/133606* (2013.01); *G02F 1/133605* (2013.01); *G02F 1/133609* (2013.01); *G02F 1/133611* (2013.01); *G02F 1/133607* (2021.01); *G02F 2201/40* (2013.01)

(58) Field of Classification Search
CPC ......... G02F 1/133606; G02F 1/133605; G02F 1/133609; G02F 1/133611; G02F 1/133607
USPC ....................................................... 362/97.2
See application file for complete search history.

(56) References Cited

U.S. PATENT DOCUMENTS

| 2012/0069575 | A1* | 3/2012 | Koh ..................... | G02B 6/0046 362/257 |
| 2012/0218752 | A1* | 8/2012 | Sumitani ........... | G02F 1/133605 362/296.01 |
| 2014/0204578 | A1* | 7/2014 | Kim .................. | G02F 1/133606 362/235 |
| 2015/0021634 | A1* | 1/2015 | Ishihara ............ | G02F 1/133611 257/88 |
| 2016/0076737 | A1* | 3/2016 | Wang ................ | G02F 1/133606 362/97.1 |
| 2019/0265549 | A1* | 8/2019 | Chen ................. | G02F 1/133603 |
| 2019/0285950 | A1* | 9/2019 | Liu .......................... | H05K 3/22 |

(Continued)

FOREIGN PATENT DOCUMENTS

| TW | 201116900 A | 5/2011 |
| TW | I475295 B | 3/2015 |

*Primary Examiner* — Christopher M Raabe
(74) *Attorney, Agent, or Firm* — Seed IP Law Group LLP

(57) ABSTRACT

Embodiments of the present disclosure relates to a light path control element, a backlight unit and a display device, and by disposing, over one or more light sources, a light path control element including a first engraved patterns located on a surface through which light exits and located to correspond to respective light sources, and a second engraved patterns located on a surface into which light is incident and located in an areas between light sources, it is possible to improve functions of guiding and diffusing light emitted from the light sources. Accordingly, by increasing a distance between light sources and enabling a hot spot to be prevented and luminance uniformity to improve, it is possible to reduce the number of light sources and provide a backlight unit producing improved image quality.

19 Claims, 32 Drawing Sheets

(56) References Cited

U.S. PATENT DOCUMENTS

2019/0324184 A1\* 10/2019 Cai ..................... G02B 6/0055
2019/0369442 A1\* 12/2019 Zhang ............... G02F 1/133606

\* cited by examiner

LIGHT

LIGHT

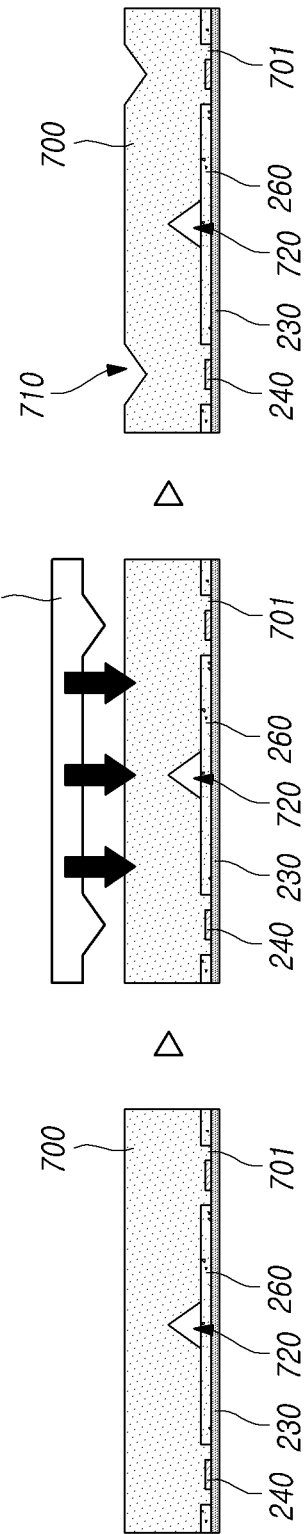

LIGHT PATH CONTROL ELEMENT, BACKLIGHT UNIT AND DISPLAY DEVICE

CROSS-REFERENCE TO RELATED APPLICATION

This application claims the priority benefit of Korean Patent Application No. 10-2019-0155204 filed Nov. 28, 2019 in the Korean Intellectual Property Office, the disclosure of which is incorporated herein by reference in its entirety.

BACKGROUND

Technical Field

The present disclosure relates to a light path control element, a backlight unit, and a display device.

Description of the Related Art

As the information society has developed, there are increasing needs for display devices displaying images. Recently, various types of display devices, such as a liquid crystal display device, an organic light emitting display device, a quantum dot display device, and the like, have been developed and utilized.

The display device can include a display panel on which a plurality of sub-pixels is arranged, and several types of driving circuits for driving elements arranged in the sub-pixels. According to types of the display devices, display devices may be provided with a backlight unit providing light to the display panel.

The backlight unit can include a plurality of light sources, several optical elements, and the like. Further, the backlight unit is typically located on an opposite side of a surface on which the display panel presents images, so that it can provide light to the display panel.

Thus, the backlight unit included in the display panel can lead a thickness of the display device to increase. Further, when reducing thickness of the backlight unit to reduce the thickness of the display device, since a sufficient optical gap between a light source and a display panel is not formed, there in turn occurs a problem that image quality can be degraded.

BRIEF SUMMARY

In accordance with embodiments of the present disclosure, a method is provided of improving image quality on a panel illuminated by a backlight unit, while reducing a thickness of the backlight unit providing light to the panel.

In accordance with embodiments of the present disclosure, a method is provided of maintaining image quality on a panel illuminated by a backlight unit while reducing the number of light sources included in the backlight unit, without increasing a thickness of the backlight unit.

In accordance with one aspect of the present disclosure, a backlight unit is provided that includes a plurality of light sources disposed on a printed circuit, and a light path control element located over one or more of the plurality of light sources, including a plurality of first engraved patterns each located in an area overlapping with all or at least a part of each of the plurality of light sources on a top surface of the light path control element, and including a plurality of second engraved patterns located in one or more areas except for areas overlapping with the plurality of light sources on a bottom surface of the light path control element.

In accordance with another aspect of the present disclosure, a backlight unit is provided that includes a plurality of light sources disposed on a printed circuit, a light source protective element located on at least one of the plurality of light sources and surrounding at least a part of an outside surface of the at least one light source, and a light conversion film located on the light source protective element and including a light diffusion layer disposed on a lower portion of the light conversion film and a plurality of light diffusion patterns disposed on an upper portion of the light conversion film.

In accordance with further another aspect of the present disclosure, a display device is provided that includes the backlight unit according to the embodiments described above, and a panel disposed over the backlight unit and receiving light from the backlight unit.

In accordance with yet another aspect of the present disclosure, a light path control element is provided that includes a plurality of first engraved patterns located on a first surface, and a plurality of second engraved patterns located on a second surface that is an opposite surface of the first surface and located in one or more areas except for areas overlapping with the plurality of first engraved patterns.

In accordance with embodiments of the present disclosure, it is possible to improve image quality on a panel illuminated by a backlight unit while reducing a thickness of the backlight unit by disposing a light conversion film including one or more light conversion patterns or one or more light diffusion patterns over one or more light sources included in the backlight unit.

In accordance with embodiments of the present disclosure, it is possible to improve light diffusion performance, increase a distance between light sources, and maintain image quality on a panel illuminated by a backlight unit, by disposing, over one or more light sources, a light path control element including a first engraved pattern formed on an opposite surface of a surface which light enters in an area corresponding to a light source and a second engraved pattern formed on an opposite surface of a surface which the light exits in an area between the light sources.

BRIEF DESCRIPTION OF THE SEVERAL VIEWS OF THE DRAWINGS

FIG. 20 illustrates an example of a method of manufacturing the light path control element according to embodiments of the present disclosure.

DETAILED DESCRIPTION

Figure 1:
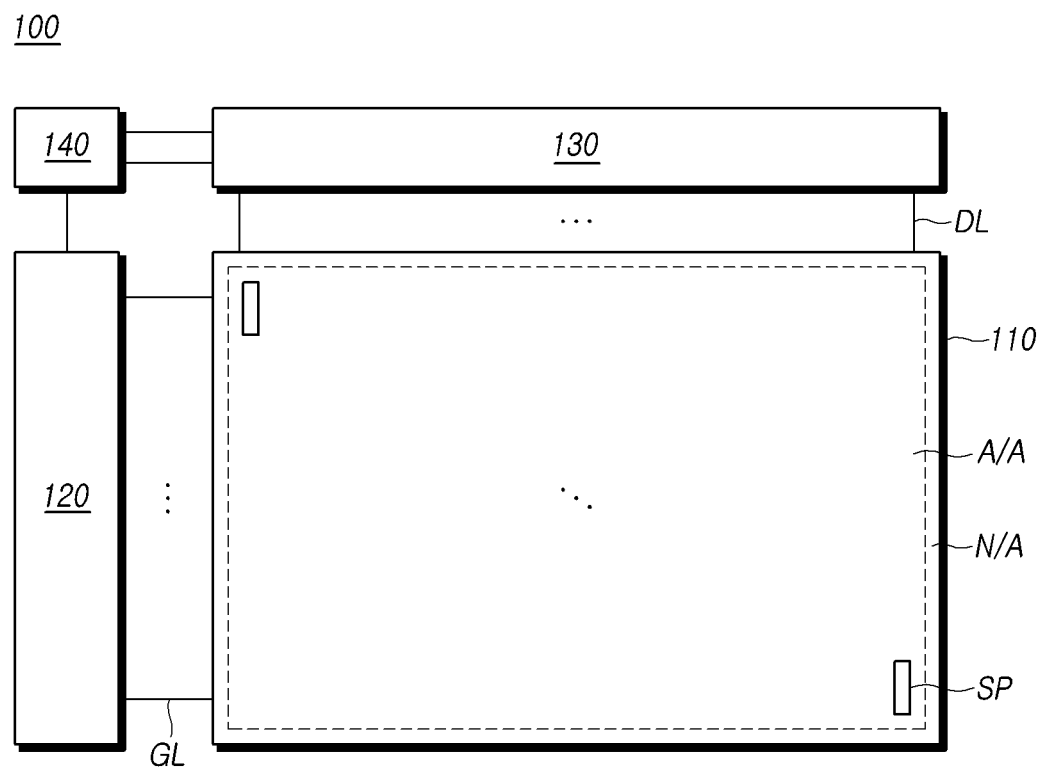
FIG. 1 is schematically illustrates a configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a display device 100 according to embodiments of the present disclosure.

Referring to FIG. 1, a display device 100 includes: a display panel 110 including an active area A/A and a non-active area N/A; a gate driving circuit 120, a data driving circuit 130, and a controller 140, for driving the display panel 110; and the like.

A plurality of data lines DL and a plurality of gate lines GL may be arranged in the display panel 110, and a plurality of subpixels SP may be arranged adjacent to the overlapping locations of the data lines DL and the gate lines GL.

The gate driving circuit 120 is controlled by the controller 140, and controls driving timings of the plurality of subpixels by sequentially outputting scan signals to the plurality of gate lines GL arranged in the display panel 110.

The gate driving circuit 120 may include one or more gate driver integrated circuits GDIC. The gate driving circuit 120 may be located on one side or both sides of the display panel 110, such as, a left or right side, a top or bottom side, the left and right sides, or the top and bottom sides, according to a driving scheme.

Each gate driver integrated circuit GDIC may be connected to a pad, such as a bonding pad, of the display panel 110 in a Tape Automated Bonding (TAB) type or a Chip On Glass (COG) type, or be directly disposed on the display panel 110 in a Gate In Panel (GIP) type. In some instances, the gate driver integrated circuit GDIC may be disposed to be integrated into the display panel 110. Each gate driver integrated circuit GDIC may be implemented in a Chip On Film (COF) type, which is mounted on a film connected to the display panel 110.

The data driving circuit 130 receives image data from the controller 140 and then converts the received image data into analog data voltages. The data driving circuit 130 outputs a data voltage to each data line DL according to a timing at which a scan signal is applied through the gate line GL is applied, and enables each subpixel SP to emit light in line with the image data.

The data driving circuit 130 may include one or more source driver integrated circuits SDIC.

Each source driver integrated circuit SDIC may include a shift register, a latch circuit, a digital to analog converter, an output buffer, and the like.

Each source driver integrated circuit SDIC may be connected to a pad, such as a bonding pad, of display panel 110 in the Tape Automated Bonding (TAB) type or the Chip On Glass (COG) type, or be directly disposed on the display panel 110. In some instances, the source driver integrated circuit SDIC may be disposed to be integrated into the display panel 110. Each source driver integrated circuit SDIC may be implemented in the Chip On Film (COF) type. In this case, each source driver integrated circuit SDIC may be mounted on a film connected to the display panel 110, and be electrically connected to the display panel 110 through lines on the film.

The controller 140 provides several control signals to the gate driving circuit 120 and the data driving circuit 130, and controls operations of the gate driving circuit 120 and the data driving circuit 130.

The controller 140 may be mounted on a printed circuit board (PCB), a flexible printed circuit (FPC), etc., and be electrically connected to the gate driving circuit 120 and the data driving circuit 130 through the printed circuit board (PCB), flexible printed circuit (FPC), etc.

The controller 140 enables the gate driving circuit 120 to output a scan signal according to a timing processed in each frame, converts image data input from external devices or image providing sources to a data signal form used in the data driving circuit 130, and then outputs image data resulted from the converting to the data driving circuit 130.

The controller 140 receives, in addition to the image data, several types of timing signals including a vertical synchronous signal VSYNC, a horizontal synchronous signal HSYNC, an input data enable signal DE, a clock signal CLK, etc., from other devices, networks, or systems (e.g., a host system).

The controller 140 can generate several types of control signals using the several types of timing signals received from an outside source such as the host system, and output the generated signals to the gate driving circuit 120 and the data driving circuit 130.

For example, to control the gate driving circuit 120, the controller 140 outputs several types of gate control signals GCS including a gate start pulse GSP, a gate shift clock GSC, a gate output enable signal GOE, and the like.

Here, the gate start pulse GSP is used for controlling a start timing for operating one or more gate driver integrated circuits GDIC included in the gate driving circuit 120. The gate shift clock GSC is a clock signal commonly inputted to one or more gate driver integrated circuits GDIC, and is used for controlling a shift timing of a scan signal. The gate output enable signal GOE is used for indicating timing information of one or more gate driver integrated circuits GDIC.

Further, to control the data driving circuit 130, the controller 140 outputs several types of data control signals DCS including a source start pulse SSP, a source sampling clock SSC, a source output enable signal SOE, and the like.

Here, the source start pulse SSP is used for controlling a data sampling start timing of one or more source driver integrated circuits SDIC included in the data driving circuit 130. The source sampling clock SSC is a clock signal for controlling a sampling timing of data in each source driving integrated circuit SDIC. The source output enable signal SOE is used for controlling an output timing of the data driving circuit 130.

Such a display device 100 may further include a power management integrated circuit for providing several types of voltages or currents to the display panel 110, the gate driving circuit 120, the data driving circuit 130, and the like, or for controlling the several types of voltages or currents to be provided.

Each subpixel SP may be an area defined by overlapping locations of each of the gate lines GL and each of the data lines DL. According to a type of the display device 100, a liquid crystal or a light emitting element may be disposed in the subpixel SP.

For example, the display device 100 that is a liquid crystal display device may include a light source apparatus such a backlight unit illuminating light to the display panel 110, and a liquid crystal may be disposed in the sub-pixel SP of the display panel 110. The display device 100 can produce brightness depending on image data and display images, by adjusting an alignment of liquid crystals through electric field resulted from the applying of a data voltage to each sub-pixel SP.

Figure 2:
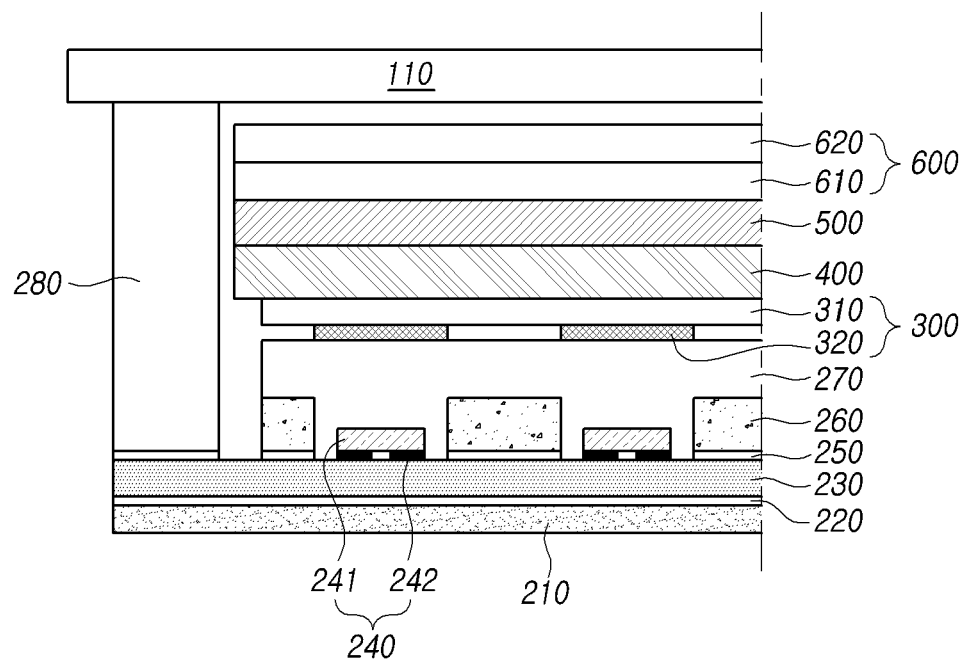
FIG. 2 illustrates an example of a backlight unit structure according to embodiments of the present disclosure.

FIG. 2 illustrates an example of a backlight unit structure included in the display device 100 according to embodiments of the present disclosure.

Referring to FIG. 2, the display device 100 may include a display panel 110, and a backlight unit disposed under the display panel 110 and providing backlight to the display panel 110.

For example, the backlight unit may include a plurality of light sources 240 disposed on a printed circuit 230. The printed circuit 230 may be disposed to be bonded with an upper surface of a plate 210 by a first adhesive tape 220.

Here, the plate 210 may be a cover bottom according to a type of the display device 100. Further, a dam 280 for supporting the display panel 110 may be disposed over the plate 210 and outside of an area in which the light sources 240, an optical element, and the like are disposed.

The light source 240 may include a light emitter 241 emitting light, and one or more electrodes 242 to which a signal for driving the light emitter 241 is applied.

Such a light source 240 may be, for example, may be a light emitting diode (LED), a mini LED, a LED, or the like. Accordingly, since the light source 240 mounted on the printed circuit 230 may have a chip type, a thickness of the backlight unit may be reduced.

Such a light source 240 may emit a white light, and in some instances, emit light of a specific wavelength band. For example, the light source 240 may emit a blue light, and a white light resulted from the exciting of the blue light by an optical element disposed over the light source 240 may be provided to the display panel 110.

A reflective plate 260 may be disposed on the printed circuit 230. The reflective plate 260 may be disposed to be bonded with an upper surface of the printed circuit 230 by a second adhesive tape 250.

The reflective plate 260 may include a plurality of holes and the light source 240 may be disposed inside of at least one of the plurality of holes included in the reflective plate 260. That is, the reflective plate 260 providing a reflective function may be disposed in at least a part of an area in which the light source 240 is not disposed on the printed circuit 230.

Here, when the light source 240 having a chip type is used, since a size of the light source 240 may be small, the reflective plate 260 may have a height greater than the light source 240. That is, an upper surface of the reflective plate 260 may be placed at a higher location than an upper portion of the light source 240 disposed in the hole.

Accordingly, light traveling in a sideways direction from the light source 240 may be reflected from a side surface of the reflective plate 260 and then travel toward a front surface of the backlight unit; through this, it is possible to increase further luminous efficiency of the backlight unit.

Further, in some instances, a coated reflective film may be disposed on the printed circuit 230.

That is, a reflective film may be disposed on a front surface of the printed circuit 230 or an area except for an area in which at least one light source 240 is disposed; thus, it is possible to cause resulted luminous efficiency to increase.

In this case, the coated reflective film on the printed circuit 230 may replace the function of the reflective plate 260, or may be disposed together with the reflective plate 260 to provide the reflective function.

A light source protective element 270 may be disposed inside of at least one hole of the reflective plate 260 and on the reflective plate 260.

The light source protective element 270 may be, for example, formed of resin.

When the light source protective element 270 is formed of resin, the light source protective element 270 may be formed by disposing a partition wall in an edge area of an area in which a plurality of light sources 240 is disposed on the printed circuit 230, or on the outside of the printed circuit 230, and depositing resin inside of the partition wall.

Further, in some instances, a first light source protective element 270 in a first hole of the reflective plate 260 and a second light source protective element 270 in a second hole adjacent to the first hole may be disposed in separate structures from each other. That is, as a light source protective element 270 is disposed to expose an upper surface of a reflective plate 260, an optical element located on the light source protective element 270 may be directly disposed on the light source protective element 270 and the reflective plate 260.

The light source protective element 270 may protect one or more of a plurality of light sources 240, and provide a function of diffusing light emitted from the light sources 240. That is, the light source protective element 270 may directly contact the light sources 240 to protect the light sources 240 and provide a function of guiding light.

A base film 310 may be disposed on the light source protective element 270, and the base film 310 may be, for example, a transparent film such as PC or PET. A plurality of light conversion patterns 320 may be disposed on at least one of an upper surface or a lower surface of the base film 310.

Here, a configuration including the base film 310 and the light conversion patterns 320 may be regarded as a light conversion film 300.

The plurality of light conversion patterns 320 may be patterns for controlling a traveling path of light, and be disposed at respective locations corresponding to a plurality of light sources 240 on the bottom surface of the base film 310.

That is, at least a part of each light conversion pattern 320 may be disposed to overlap with each light source 240, and when taking account of diffusion characteristics of light, be disposed to overlap with an area including an area in which the light source 240 is disposed.

For example, each light conversion pattern 320 may be disposed to correspond to a hole formed in the reflective plate 260. Further, in some instances, an area of a light conversion pattern 320 may be identical to that of a hole of the reflective plate 260. In further another embodiment, the area of the light conversion pattern 320 may be smaller, or greater, than that of a hole included in the reflective plate 260 depending on intensity of light emitted from a light source 240, a distance between the light source 240 and the light conversion pattern 320, and the like.

The light conversion pattern 320 may have a predetermined reflectance, and may scatter, reflect, diffract or transmit some of light emitted from the light source 240.

The light conversion pattern 320 may scatter, reflect, diffract some of light emitted in a vertical direction or an inclined direction from the light source 240. Further, the light conversion pattern 320 may a light control pattern allowing some of light emitted from the light source 240 to transmit.

For example, the light conversion pattern 320 may scatter light emitted from the light source 240 and cause the light to travel in a vertical direction or an inclined direction. In another embodiment, the light conversion pattern 320 may cause light to travel toward an area between light sources by reflecting light emitted from the light source 240 and causing the reflected light to be reflected again by the reflective plate 260.

That is, by disposing the light conversion pattern 320 in an area in which the intensity of light emitted from the light source 240 is the strongest, it is possible to reduce a difference in luminance between an area in which a light source 240 is disposed (an area in which an amount of light is relatively large) and an area between light sources 240 (an area in which an amount of light is relatively small), or the like.

Thus, image quality on a panel illuminated by a backlight unit can be improved by adjusting a direction in which light emitted from a light source 240 travels using the light conversion pattern 320. That is, the light emitted from the light source 240 is scattered, reflected, diffracted or transmitted by the light conversion pattern 320; therefore, luminance uniformity of the backlight unit can be improved.

A diffusion plate 400 may be disposed on the base film 310 to diffuse light incident through the bottom surface of base film 310.

A color conversion sheet 500 may be disposed on the diffusion plate 400 to change a wavelength range of light emitted from the light source 240. Further, one or more optical sheets 600 may be disposed on the color conversion sheet 500. For example, a prism sheet 610, a diffusion sheet 620, and the like may be disposed on the color conversion sheet 500.

Here, respective locations at which the diffusion plate 400 and the color conversion sheet 500 are disposed may be interchanged.

The diffusion plate 400 can diffuse light traveling through the base film 310.

The color conversion sheet 500 can enable light in a specific wavelength range to be emitted in response to incident light.

For example, when a light source 240 emits light in a first wavelength range (e.g., blue light), the color conversion sheet 500 may enable light in a second wavelength range (e.g., green light) and light in a third wavelength range (e.g., red light) to be emitted in response to the incident light. Accordingly, light in a white wavelength range may be provided to the display panel 110 through the color conversion sheet 500.

In some instances, such a color conversion sheet 500 may be disposed only on a partial area of the diffusion plate 400.

For example, when a light source 240 emits blue light, the color conversion sheet 500 may be disposed only in an area except for an area corresponding to an area in which the blue subpixel is disposed in a display panel 110. That is, light that has not passed through the color conversion sheet 500 can reach the blue subpixel SP of the display panel 110.

Such a color conversion sheet 500 may not be disposed depending on a light source 240.

For example, the color conversion sheet 500 may not be disposed when a light source 240 emits white light, or when a color conversion film emitting green light and red light is coated on a surface which light emitted from a light source 240 emitting blue light exits, or the like.

Like this, in accordance with embodiments of the present disclosure, a backlight unit capable of satisfying image quality can be provided while reducing a thickness of the backlight unit, by including the base film 310 on which at least one light conversion pattern 320 located to correspond to a light source 240 is disposed and optical elements.

Further, the light conversion pattern 320 disposed on the base film 310 may be disposed in various structures.

Figure 3:
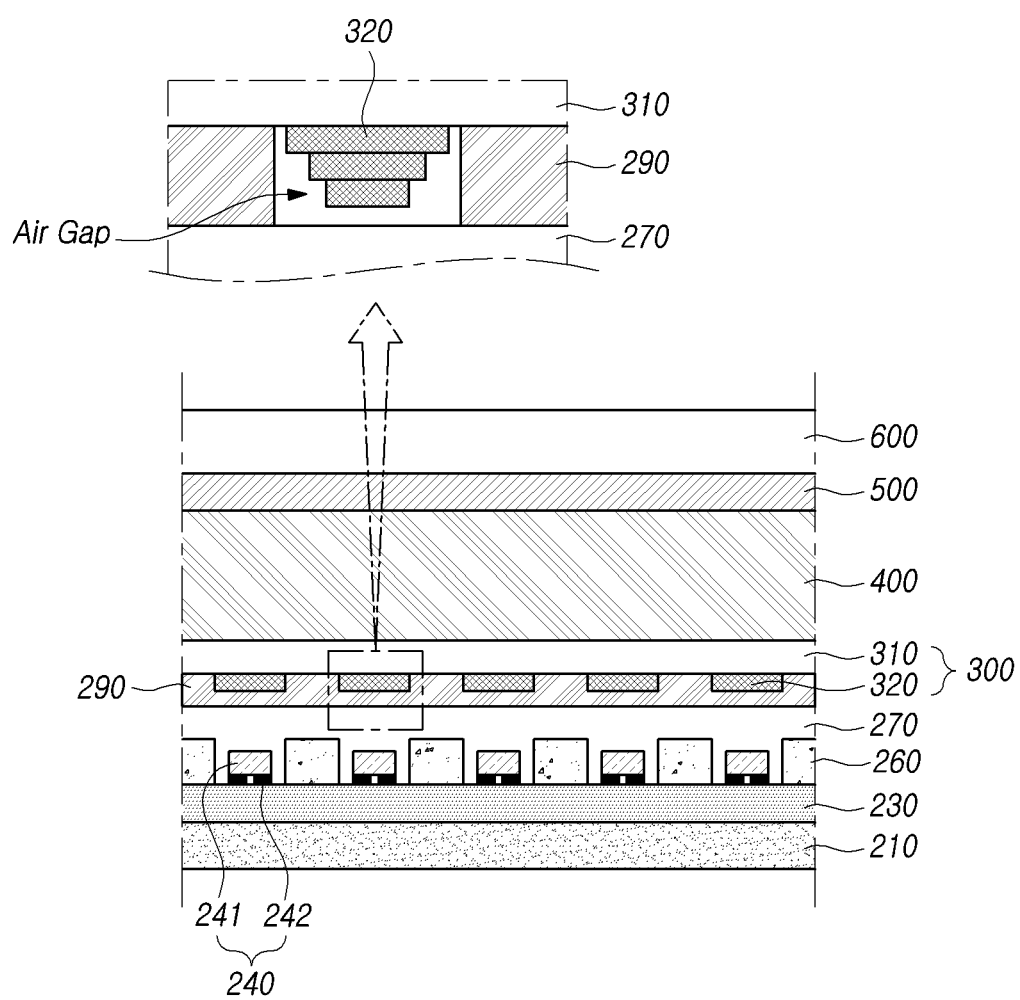
FIG. 3 illustrates an example of a structure of light conversion patterns included in a light conversion film according to embodiments of the present disclosure.

FIG. 3 illustrates an example of a structure of light conversion patterns 320 included in the light conversion film 300 according to embodiments of the present disclosure.

Referring to FIG. 3, a printed circuit 230 may be disposed on a plate 210, and a plurality of light sources 240 may be disposed on the printed circuit 230. Further, a reflective plate 260 may be disposed in at least a part of an area except for an area in which the light sources 240 are disposed on the printed circuit 230.

Here, the light source 240 may be, for example, a light emitting diode (LED), and include a light emitter 241 including a n-type semiconductor layer, an active layer and a p-type semiconductor layer, and one or more electrodes 242.

A light source protective element 270 may be disposed on the plurality of light sources 240 and the reflective plate 260.

A base film 310 may be disposed on the light source protective element 270, and light conversion patterns 320 may be disposed at respective locations corresponding to the light sources 240 on the bottom surface of the base film 310. Further, a diffusion plate 400, a color conversion sheet 500, an optical sheet 600, and the like may be disposed on the base film 310.

The light conversion patterns 320 disposed on the bottom surface of the base film 310 may be implemented such that a material having properties of blocking light is printed on the base film 310.

For example, the light conversion patterns 320 may be disposed using a method of printing titanium dioxide (TiO2) ink on the base film 310. When the light conversion patterns 320 use TiO2 and are formed of one layer, corresponding reflectance may be 60 to 70%. Further, absorption/transmittance may be 30-40%.

Further, the light conversion patterns 320 disposed on the bottom surface of the base film 310 may be formed of a single layer or multiple layers.

For example, the light conversion patterns 320 may be formed of two layers, and in this case, corresponding reflectance may be 60 to 80%. Further, absorption/transmittance may be 20-30%. However, the reflectance of the light conversion patterns 320 in accordance with embodiments of the present disclosure is not limited thereto. For example, when the content of TiO2 included in the light conversion patterns 320 increases, or a thickness of a layer on which the light conversion patterns 320 are disposed increases, the reflectance of the light conversion patterns 320 may increase and the transmittance of the light conversion patterns 320 may decrease.

Further, in some instances, as shown in FIG. 3, the light conversion patterns 320 disposed on the bottom surface of the base film 310 may be formed of three layers.

Such a light conversion pattern 320 may be implemented using a method of printing a material of blocking light on the base film 310 three times, and an area of the light blocking material to be printed may become narrower. Further, by disposing the base film 310 on which the light conversion patterns 320 are disposed on the light source protective element 270 such that the light conversion patterns 320 face the light source protective element 270, the light conversion patterns 320 may be disposed over light sources 240.

Accordingly, an area of each light conversion pattern 320 may become gradually narrower from the top surface toward the bottom surface of the base film 310, and a thickness in a center area of the light conversion pattern 320 may be greater than that in an edge area thereof.

That is, since light emitted in the vertical direction from the light source 240 has the strongest intensity, the center area of the light conversion pattern 320 may be formed to have larger thickness.

Like this, by disposing a light conversion pattern 320 over a light source 240 so that they can overlap with each other in a plan view, it is possible to cause a traveling path of light emitted in the vertical direction from the light source 240 to be changed and to prevent a hot spot from being produced in an area in which the light source 240 is disposed.

The base film 310 on which the light conversion pattern 320 is disposed may be bonded on the light source protective element 270 by an adhesive layer 290.

The adhesive layer 290 may be, for example, an optical clear adhesive OCA.

Further, the adhesive layer 290 may be disposed in at least a part of an area except for an area in which the light conversion pattern 320 is disposed in the bottom surface of the base film 310.

Accordingly, the adhesive layer 290 may not be disposed in the area in which the light conversion pattern 320 is disposed, and an air gap (or an air layer) may be present between the light conversion pattern 320 and the light source protective element 270.

Further, a lateral portion of the light conversion pattern 320 and the adhesive layer 290 may be spaced apart from each other.

As the air gap is present between the light conversion pattern 320 and the light source protective element 270, light traveling in a sideways direction from the light conversion pattern 320 may be reflected by the air gap.

That is, the light traveling in the sideways direction from the light conversion pattern 320 may travel at a large refractive angle by the air layer with a low refractive index or be refracted from the air layer. Further, since the light refracted from the air layer may be reflected again by the reflective plate 260, and then may exit the backlight unit, thus, luminous efficiency can be increased while supporting a light blocking function or a light path changing function of the light conversion pattern 320.

Like this, through a structure in which a light conversion pattern 320 and an air gap is disposed in a location corresponding to a light source 240, it is possible to cause the luminous efficiency of the backlight unit to increase while a hot spot is prevented from being produced.

Further, the light conversion patterns 320 disposed on the bottom surface of the base film 310 may be differently formed depending on locations at which light conversion patterns 320 are disposed.

Figure 4:
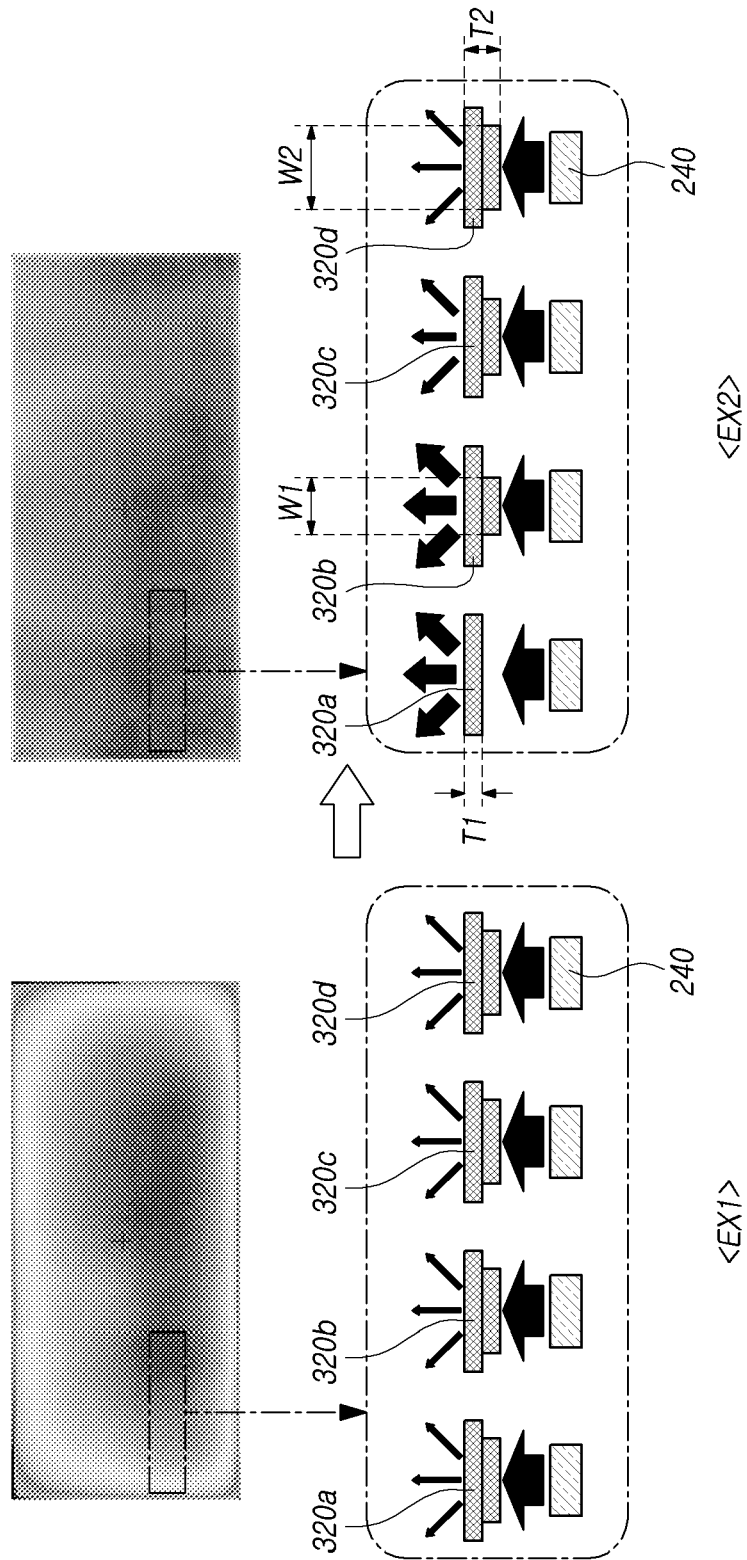
FIGS. 4 and 5 illustrate an example of structures according to locations of light conversion patterns included in the light conversion film according to embodiments of the present disclosure.
Figure 5:
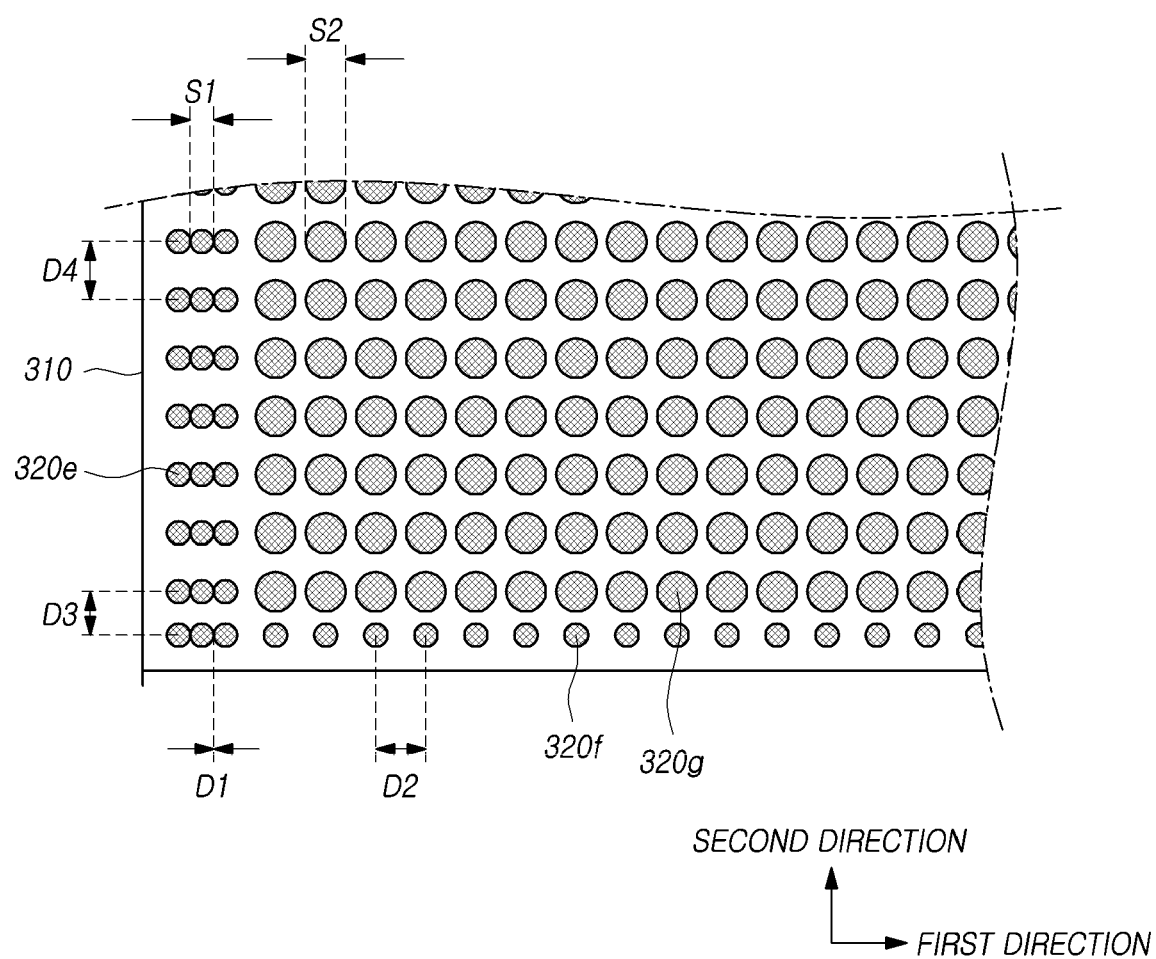

FIGS. 4 and 5 illustrate an example of structures according to locations of light conversion patterns 320 included in the light conversion film 300 according to embodiments of the present disclosure.

FIG. 4 illustrates an example of luminance illuminated through a backlight unit according to structures of light conversion patterns 320. Here, EX1 represents an example of luminance measured when light conversion patterns 320 are disposed in a uniform structure, and EX2 represents an example of luminance measured when light conversion patterns 320 are disposed in different structures according to locations.

As shown in the EX1 of FIG. 4, when a light conversion pattern 320a disposed in an edge area of the backlight unit and a light conversion pattern 320d disposed in a center area thereof have identical structure to each other, luminance in the edge area of the backlight unit is relatively low.

That is, since the number of light sources providing light to the edge area of the backlight unit is relatively small, when light conversion patterns with light blocking capability of an identical level are disposed, luminance in the edge area may be relatively lowered compared with that in the center area of the backlight unit.

Accordingly, as shown in the EX2 of FIG. 4, when a light conversion pattern 320a disposed in the edge area of the backlight unit and a light conversion pattern 320d disposed in the center area thereof are disposed to have different structures, it is possible to cause luminance in the edge area of the backlight unit to be prevented from being lowered, and in turn, entire luminance to be uniform.

For example, light conversion patterns 320 may be disposed such that a thickness T1 of the light conversion pattern 320a disposed in the edge area of the backlight unit is smaller than a thickness T2 of the light conversion pattern 320d disposed in the center area of the backlight unit.

In another embodiment, light conversion patterns 320 may be disposed such that an area W1 of the thickest portion in a light conversion pattern 320b disposed to be adjacent to the edge area of the backlight unit is smaller than an area W2 of the thickest portion in the light conversion pattern 320d. That is, the light conversion patterns 320 may be disposed such that an area of a portion with a high light blocking capability in a light conversion pattern 320a or 320b disposed in the edge area or the area adjacent to the edge area of the backlight unit becomes small.

Further, the light conversion patterns 320 may be disposed such that a thickness of the light conversion patterns 320 gradually decreases or an area of the thickest portion in the light conversion patterns 320 gradually decreases, from the center area toward the edge area of the backlight unit.

Further, in some instances, the number of light sources 240 or a distance between light sources 240 may be disposed to be different in the center area and the edge area of the backlight unit, or different light conversion patterns 320 may be disposed in the center area and the edge area of the backlight unit.

FIG. 5 illustrates another structure in which light conversion patterns 320 are disposed on the bottom surface of a base film 310.

In this embodiment, a distance between light sources 240 disposed in an edge area of a backlight unit may be smaller than a distance between light sources 240 disposed in a center area of the backlight unit. That is, the light sources 240 in the edge area of the backlight unit may be disposed more tightly so that luminance in the edge area and luminance in the center area of the backlight unit can become uniform.

Further, since the light conversion patterns 320 disposed on the bottom surface of the base film 310 are disposed to correspond to light sources 240, the distance between the light conversion patterns 320 disposed in the edge area of the backlight unit may be different from the distance between the light conversion patterns 320 disposed in the center area of the backlight unit.

For example, a distance D1 in a first direction between light conversion patterns 320 disposed in the edge area of the backlight unit may be smaller than a distance D2 in the first direction between light conversion patterns 320 disposed in the center area of the backlight unit. Further, a distance D3 in a second direction between the light conversion patterns 320 disposed in the edge area of the backlight unit may be smaller than a distance D4 in the second direction between the light conversion patterns 320 disposed in the center area of the backlight unit.

Further, a size, a thickness, and the like of a light conversion pattern 320 disposed in the edge area of the backlight unit may be different from those of a light conversion pattern 320 disposed in the center area of the backlight unit.

For example, as shown in FIG. 5, a size S of a light conversion pattern 320e or 320f disposed in the edge area of the backlight unit may be smaller than a size S2 of a light conversion pattern 320g disposed in the center area of the backlight unit.

In another embodiment, as described above, light conversion patterns 320 may have multiple layer structure, and in this case, a thickness of the light conversion pattern 320e or 320f disposed in the edge area of the backlight unit, or an area of a portion in which the light conversion pattern 320e or 320f has the greatest thickness may be smaller than a thickness of the light conversion pattern 320g disposed in the center area of the backlight unit, or an area of a portion in which the light conversion pattern 320g has the greatest thickness.

That is, by configuring the light conversion patterns 320e and 320f disposed in the edge area of the backlight unit to have a small size, the light conversion patterns 320e and 320f may be disposed to correspond to light sources 240 each of which is disposed in a narrow interval with one another. Accordingly, it is possible to prevent a hot spot from being produced at a location corresponding to a light source 240 in the edge area of the backlight unit.

Further, by lowering a level at which light emitted from a light source 240 in the edge area of the backlight unit is blocked, the backlight unit of the display device according to embodiments of the present disclosure can enable an amount of the light exiting the backlight unit to be increased and luminance degradation in the edge area of the backlight unit to be prevented, and in turn, it is possible to achieve uniform luminance in the entire area of the backlight unit.

Like this, by configuring structures of the light conversion patterns 320 to be different for each area of the backlight unit, luminance degradation in the edge area of the backlight unit can be prevented, and luminance uniformity can be improved. Through structures in which light conversion patterns 320 are disposed as described above, it is possible to prevent a hot spot from being produced at the backlight unit and improve luminance uniformity in the entire area of the backlight unit.

Here, although image quality on a panel illuminated by the backlight unit can be improved by a light conversion film 300 including the light conversion patterns 320, since the light conversion patterns 320 are required to be disposed to correspond to respective light sources 240, there may occur a problem in manufacturing process.

In accordance with embodiments of the present disclosure, a light conversion film 300 is provided that allows light conversion patterns to be easily disposed, while improving image quality of a panel illuminated by the backlight unit.

Figure 6:
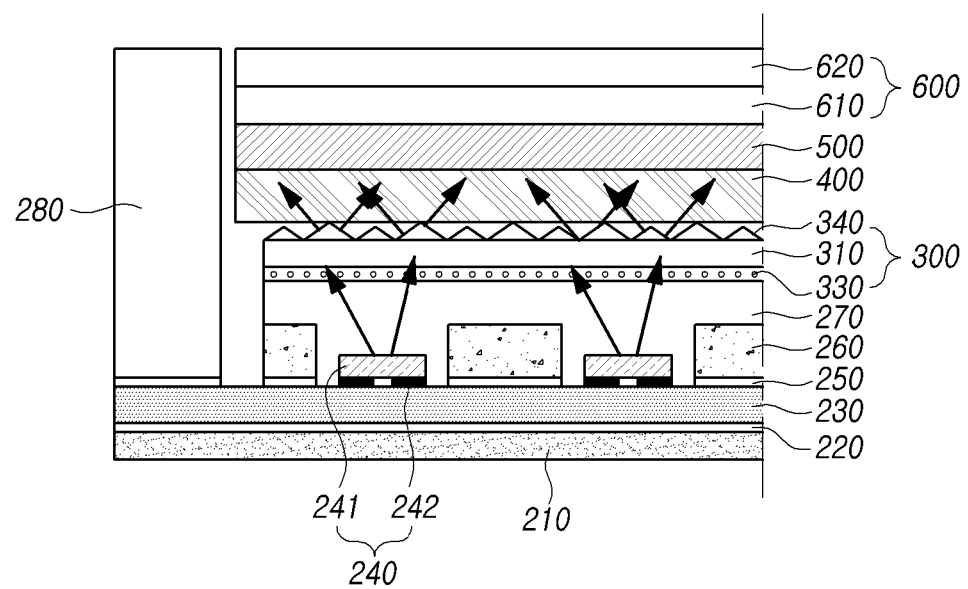
FIG. 6 illustrates another example of a light conversion film according to embodiments of the present disclosure.

FIG. 6 illustrates another example of a light conversion film 300 according to embodiments of the present disclosure.

Referring to FIG. 6, a light source protective element 270 may be disposed on light sources 240. Further, a light conversion film 300 may be disposed on the light source protective element 270.

The light conversion film 300 may include a base film 310, a light diffusion layer 330 disposed on the bottom surface of the base film 310, and light diffusion patterns 340 disposed on the top surface of the base film 310.

The base film 310 may be formed of polymer, such as PC or PET, or glass. Further, the light diffusion layer 330 disposed on the bottom surface of the base film 310 is a layer for firstly diffusing light emitted from one or more light sources 240, for example, a layer including a scattering agent, such as beads or the like.

The light diffusion patterns 340 disposed on the top surface of the base film 310 are patterns for diffusing light passing through the base film 310, for example, patterns in which resin or the like is arranged while maintaining a certain or constant shape.

For example, the light diffusion patterns 340 may have a cone shape. In another example, the light diffusion patterns 340 may have a prism shape.

Further, respective sizes of the light diffusion patterns 340 may be equal, or as shown in FIG. 6, light diffusion patterns 340 with different sizes from one another may be mixed to be disposed.

That is, light diffusion patterns 340 may have an equal shape and be disposed at an equal interval on the top surface of the base film 310. Alternatively, the light diffusion patterns 340 may have two or more shapes, and in this case, the light diffusion patterns 340 having different shapes from one another may be disposed to overlap with one another on the top surface of the base film 310.

Figure 7A:
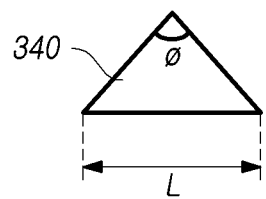
FIGS. 7A to 7C illustrate an example of a structure of light diffusion patterns included in the light conversion film shown in FIG. 6 according to embodiments of the present disclosure.
Figure 7B:
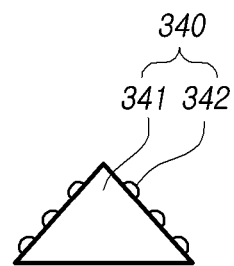
Figure 7C:

FIGS. 7A through 7C illustrate an example of a structure of a light diffusion pattern 340 included in the light conversion film 300 shown in FIG. 6 according to embodiments of the present disclosure.

Referring to FIG. 7A, a light diffusion pattern 340 may have a shape of a triangular cross section, and a size of a corresponding apex angle ϕ may be 90 degrees, or may be larger or smaller than 90 degrees. In some instances, two or more light diffusion patterns 340 having different apex angles from one another may be disposed on the top surface of the base film 310.

A length L of the light diffusion pattern 340 may be determined depending on a distance between a light source 240 and the light conversion film 300, and the like. For example, the length L of the light diffusion pattern 340 may be less than or equal to 100 μm; however, embodiments of the present disclosure are not limited thereto.

As shown in FIG. 7B, the light diffusion pattern 340 may include a first portion 341 in which the light diffusion pattern 340 has a regular shape and a second portion 342 in which the light diffusion pattern 340 has a specific shape on one or more side surfaces thereof.

In another example, as shown in FIG. 7C, the light diffusion pattern 340 may have a lens structure.

Shapes of one or more light diffusion patterns 340 are not limited to the examples described above, and may have various shapes.

Like this, by disposing the light conversion film 300 including the light diffusion layer 330 and the light diffusion patterns 340 on the light source protective element 270, it is possible to enable light to diffuse sufficiently while changing traveling paths of light emitted from one or more light sources 240, and in turn, image quality of a panel illuminated by the backlight unit can be improved.

Further, since one or more light diffusion patterns 340 are disposed on entire area of a surface of the base film 310, and in turn, are not needed to be disposed to correspond to one or more light sources 240, a process of disposing the light conversion film 300 can be easily performed.

Further, the light conversion film 300 having a multiple layer structure may be disposed on the light source protective element 270, or one or more light diffusion patterns 340 may be directly disposed on the light source protective element 270 without disposing the light conversion film 300.

Figure 8:
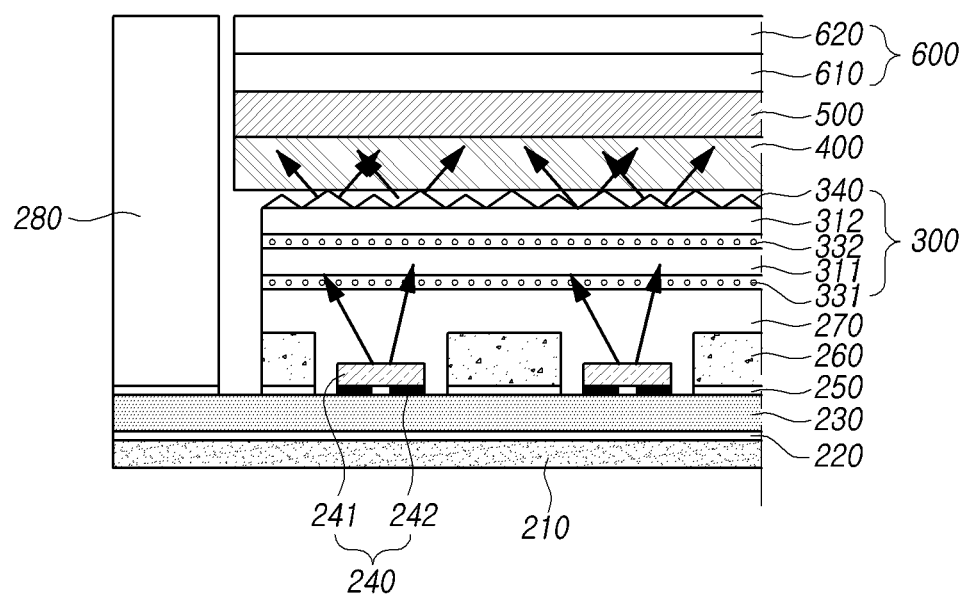
FIGS. 8 and 9 illustrate further examples of light conversion films according to embodiments of the present disclosure.
Figure 9:
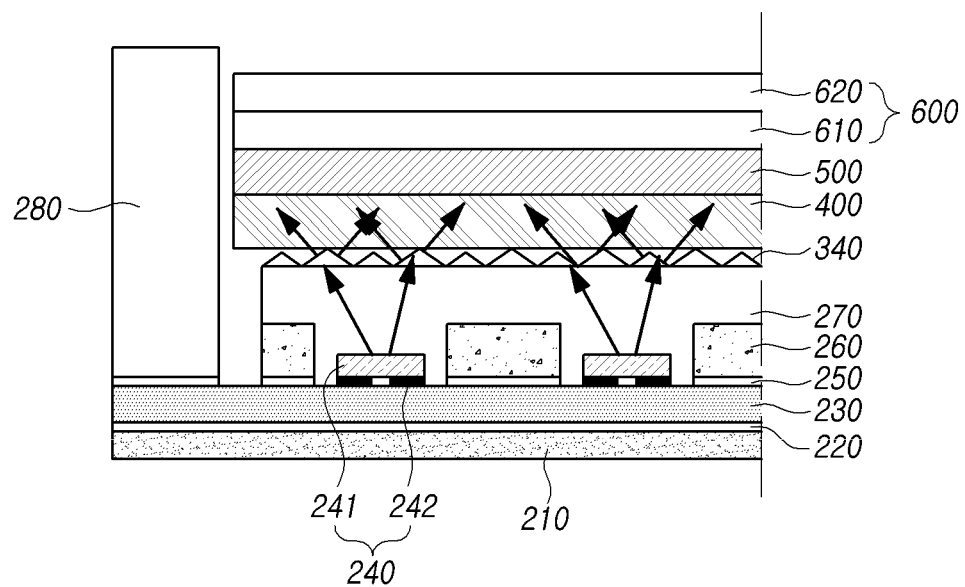

FIGS. 8 and 9 illustrate further examples of light conversion films 300 according to embodiments of the present disclosure.

Referring to FIG. 8, a light source protective element 270 may be disposed on one or more light sources 240, and a light conversion film 300 may be disposed on the light source protective element 270.

At least one of a light diffusion layer and one or more light diffusion patterns included in the light conversion film 300 may have a multiple layer structure.

For example, as shown in FIG. 8, the light conversion film 300 may include a first base film 311 and a second base film 312. A first light diffusion layer 331 may be disposed on the bottom surface of the first base film 311, and a second light diffusion layer 332 may be disposed on the bottom surface of the second base film 312. One or more light diffusion patterns 340 may be disposed on the top surface of the second base film 312.

In another embodiment, one or more light diffusion patterns 340 may be disposed on the top surface of the first base film 311 and the top surface of the second base film 312.

Like this, by disposing the light diffusion layer or the light diffusion pattern(s) 340 with multiple layer structure, it is possible to improve light diffusion performance using the light conversion film 300.

Further, in some instances, in order to reduce or minimize a thickness caused by the disposing of the light conversion film 300, one or more light diffusion patterns 340 may be directly disposed on the light source protective element 270.

Referring to FIG. 9, a light source protective element 270 may be disposed on one or more light sources 240, and light diffusion patterns 340 with an equal shape may be disposed on the light source protective element 270.

For example, the light diffusion patterns 340 may be formed by curing resin.

Accordingly, it is possible to dispose one or more light diffusion patterns 340 by curing the resin to have an equal shape on the light source protective element 270, or to dispose one or more light diffusion patterns 340 by forming an equal shape on the top surface of the light source protective element 270 to be formed of resin.

Thus, by disposing one or more light diffusion patterns 340 on the light source protective element 270, it is possible to sufficiently diffuse light emitted from one or more light sources 240 while reducing or minimizing a thickness of the backlight unit, and in turn, to improve image quality of a panel illuminated by the backlight unit.

Alternatively, instead of a light source protective element 270 providing a light guide function, by disposing at least one optical element providing light guide and diffusion functions on one or more light sources 240, it is possible to enhance more diffusion performance of light emitted from one or more light sources 240.

Figure 10:
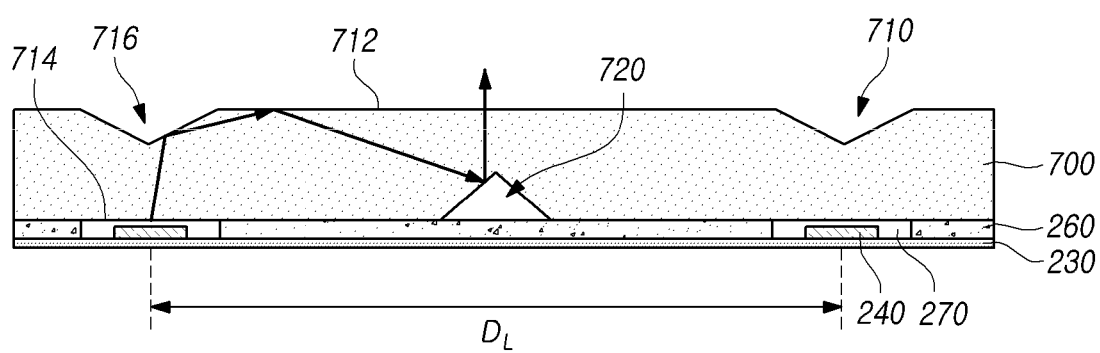
FIGS. 10 and 11 illustrate further examples of backlight unit structures according to embodiments of the present disclosure.
Figure 11:
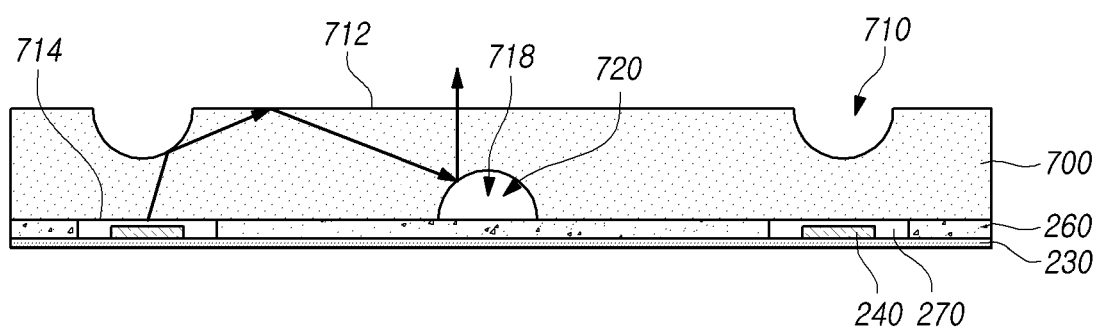

FIGS. 10 and 11 illustrate further examples of backlight unit structures according to embodiments of the present disclosure.

Referring to FIGS. 10 and 11, the backlight unit may include a plurality of light sources 240, and a light path control element 700 located on the light sources 240.

Although not shown in FIGS. 10 and 11, optical elements, such as a diffusion plate 400, a color conversion sheet 500, an optical sheet 600, and the like, may be disposed on the light path control element 700.

The light source 240 may be disposed to be mounted on a printed circuit 230.

A reflective plate 260 may be disposed in an area in which the light source 240 is not present on the printed circuit 230. In another example, a separate reflective plate 260 may not be disposed when a reflective film is coated on the printed circuit 230. Further, in another example, a reflective plate 260 may be disposed on the coated reflective film.

When a reflective plate 260 is disposed, the reflective plate 260 may have a plurality of holes, and light sources 240 may be disposed inside of the respective holes. Further, the light source protective element 270 may be disposed inside of the hole of the reflective plate 260, and may be disposed to surround the light source 240.

Here, the top surface of the light source protective element 270 and the top surface of the reflective plate 260 may be placed on an identical plane. For example, in some embodiments, the top surface of the light source protective element 270 and the top surface of the reflective plate 260 may be coplanar with each other.

Further, the light path control element 700 may be disposed on the light source protective element 270 and the reflective plate 260.

The light path control element 700 may be disposed to contact the top surface of the light source protective element 270, and a refractive index of the light path control element 700 and a refractive index of the light source protective element 270 may be identical. Accordingly, light emitted from one or more light sources 240 can travel through the light path control element 700 and the light source protective element 270.

When the reflective plate 260 is not disposed, one or more light source protective elements 270 may be disposed on at least part of the area or on the entire area of a surface of the printed circuit 230, and the light path control element 700 may be disposed on the one or more light source protective elements 270. In another example, the light path control element 700 may be directly on one or more light sources 240, or have a structure in which the light path control element 700 surrounds the outer surface of the light source 240. That is, the light path control element 700 and the light source protective element 270 may be formed integrally. In some examples, when the reflective plate 260 and the light source protective elements 270 are not disposed, the light path control element 700 may be formed in the place of the reflective plate 260 and the light source protective elements 270. In these cases, the light path control element 700 may be directly on and contacting the one or more light sources 240.

The light path control element 700 may include at least one engraved pattern on a top surface 712 that is a surface which light exits (or "a first surface") and a bottom surface 714 that is a surface which light enters (or "a second surface").

For example, a plurality of first engraved patterns 710 may be disposed in respective areas corresponding to light sources 240, on the top surface 712 of the light path control element 700.

The first engraved patterns 710 may be disposed in areas overlapping with areas in which light sources 240 are disposed. That is, the first engraved patterns 710 may be disposed to correspond to respective light sources 240, and an area on the plane of each first engraved pattern 710 may be equal to that of a light source 240, or be larger or smaller than that of the light source 240. Further, the area on the plane of each first engraved pattern 710 may be identical to an area of a hole of the reflective plate 260, in which a light source 240 is disposed, or be larger or smaller than that of the hole.

A width of the first engraved pattern 710 may become smaller from the top surface 712 of the light path control element 700 toward an inner area 716 thereof; however, embodiments of the present disclosure are not limited thereto. For example, the first engraved pattern 710 may a cone shape. That is, in some instances, as shown in FIG. 11, the first engraved pattern 710 may have a shape similar to a hemisphere. Further, other shapes of the first engraved pattern 710 that protrudes inward towards the light path control element 700 may also be contemplated.

A material having a refractive index smaller than a refractive index of the light path control element 700 may be disposed inside of the first engraved pattern 710. For example, air may be filled inside of the first engraved pattern 710.

Since the light source protective element 270 has the same refractive index as the light path control element 700, light emitted from the light source 240 may enter the light path control element 700 passing through the light source protective element 270.

Further, the light that has entered the light path control element 700 may be reflected, refracted, diffracted, or scattered from the first engraved pattern 710 located on the top surface of the light path control element 700. Further, in some instances, some of the light may travel in the upward direction from the light path control element 700 through the first engraved pattern 710.

That is, traveling paths of most of light emitted from one or more light sources 240 can be changed by the first engraved pattern 710 in which the material having the refractive index smaller the refractive index of the light path control element 700 is disposed.

Further, a plurality of second engraved patterns 720 may be disposed between light sources 240, on the bottom surface of the light path control element 700.

The second engraved patterns 720 may be disposed in areas except for areas in which the second engraved patterns 720 overlap with light sources 240 in a plan view. Further, the second engraved patterns 720 may be disposed in areas except for areas in which the second engraved patterns 720 overlap with the holes of the reflective plate 260 in a plan view.

Each of the second engraved patterns 720 may be disposed in each area between light sources 240, or in some instances, two or more second engraved patterns 720 may be disposed in each area between the light sources 240. Further, when one second engraved pattern 720 is disposed between two light sources 240, a distance between the second engraved pattern 720 and one of the light sources 240 may be identical to a distance between the second engraved pattern 720 and the other of the light sources 240.

A width of the second engraved pattern 720 may become narrower from the bottom surface 714 of the light path control element 700 toward an inner area 718 thereof. For example, the second engraved pattern 720 may a cone shape; however, embodiments of the present disclosure are not limited thereto. In another embodiment, as shown in FIG. 11, the second engraved pattern 720 may have a shape similar to a hemisphere.

A material having a refractive index smaller than a refractive index of the light path control element 700 may be disposed inside of the second engraved pattern 720. For example, air may be filled inside of the second engraved pattern 720.

Accordingly, when light emitted from one or more light sources 240 reaches the second engraved pattern 720 after being reflected from at least one first engraved pattern 710 and the like, the light may be reflected, refracted, diffracted, or scattered. Accordingly, the light may travel in the upward direction from the second engraved pattern 720.

In some instances, some of the light may travel toward the inside of the second engraved pattern 720. In this case, the light having entered the inside of the second engraved pattern 720 may be reflected by the reflective plate 260 located under the second engraved pattern 720.

Thus, since traveling paths of light emitted from a light source 240 are changed by the first engraved pattern 710 formed on the top surface of the light path control element 700, light with a strong intensity in an area in which the light source 240 is disposed can travel in the upward direction; it is therefore possible to prevent a hot spot from being produced.

Further, it is possible to improve the uniformity of luminance across areas of the backlight unit by increasing an amount of light traveling in the upward direction in an area in which the second engraved pattern 720 is disposed by the second engraved pattern 720 disposed between light sources 240.

Since the performance of guiding and diffusing light by the light path control element 700 can be enhanced, a distance DL between light sources 240 can be increased.

Further, since image quality can be maintained while increasing the distance between light sources 240, the number of light sources 240 included in the backlight unit can be reduced, and a backlight unit with enhanced image quality can be provided.

Further, since light guide and diffusion functions are provided by the light path control element 700, the number of optical elements or a configuration resulted from the optical elements, which are included in the backlight unit, can be reduced or simplified, and image quality of a panel illuminated by the backlight unit can be enhanced.

Shapes, specifications, and the like of the first engraved pattern 710 included in the light path control element 700 may be identical to, or different from, those of the second engraved pattern 720. Further, a material disposed inside of the first engraved pattern 710 may be identical to, or different from, that disposed inside of the second engraved pattern 720.

Figure 12A:
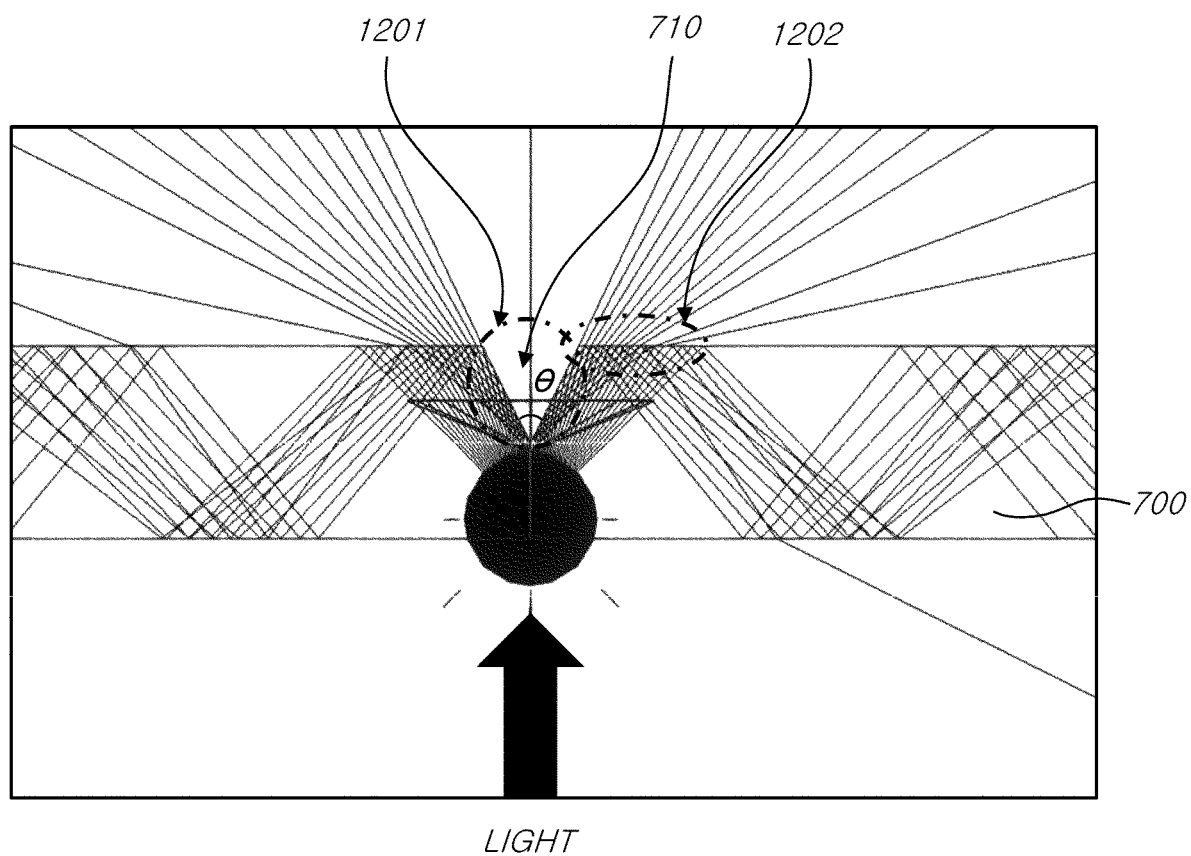
FIGS. 12A to 13C illustrate traveling paths of light according to first engraved patterns of a light path control element according to embodiments of the present disclosure.
Figure 12B:
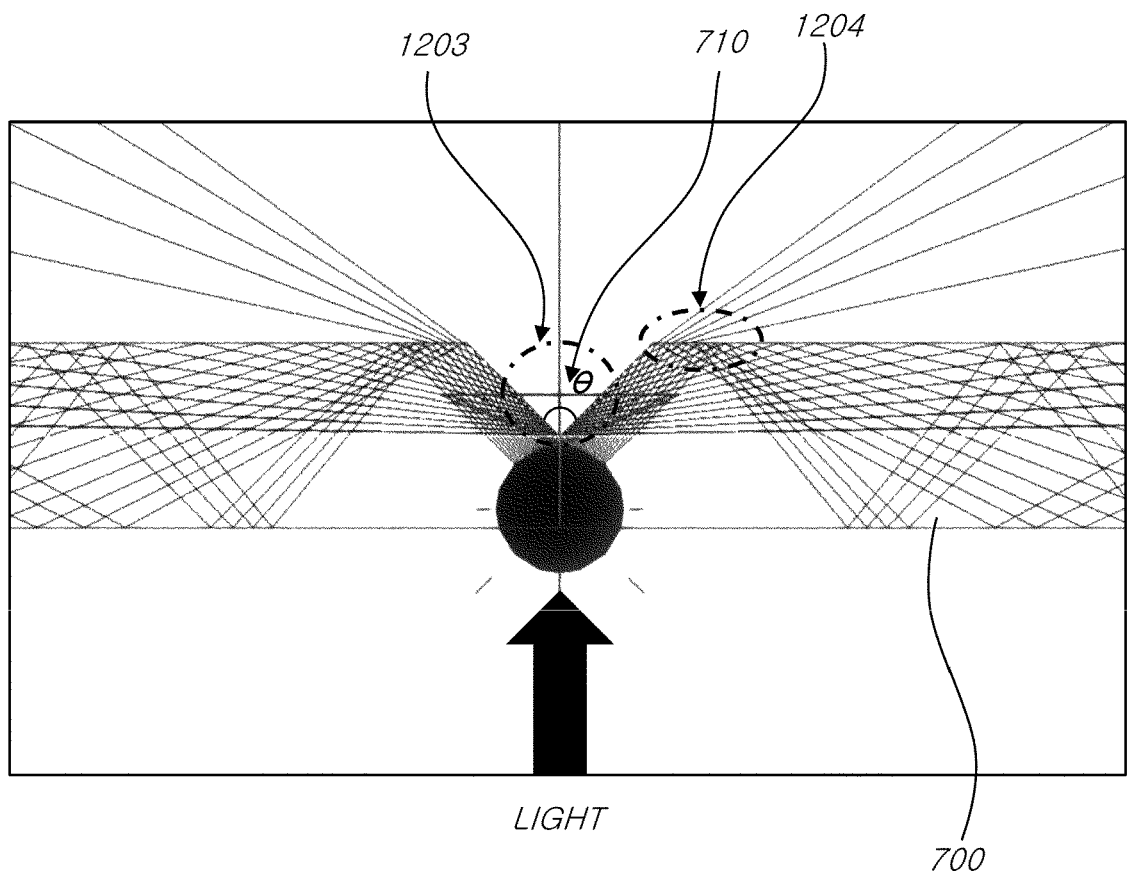
Figure 12C:
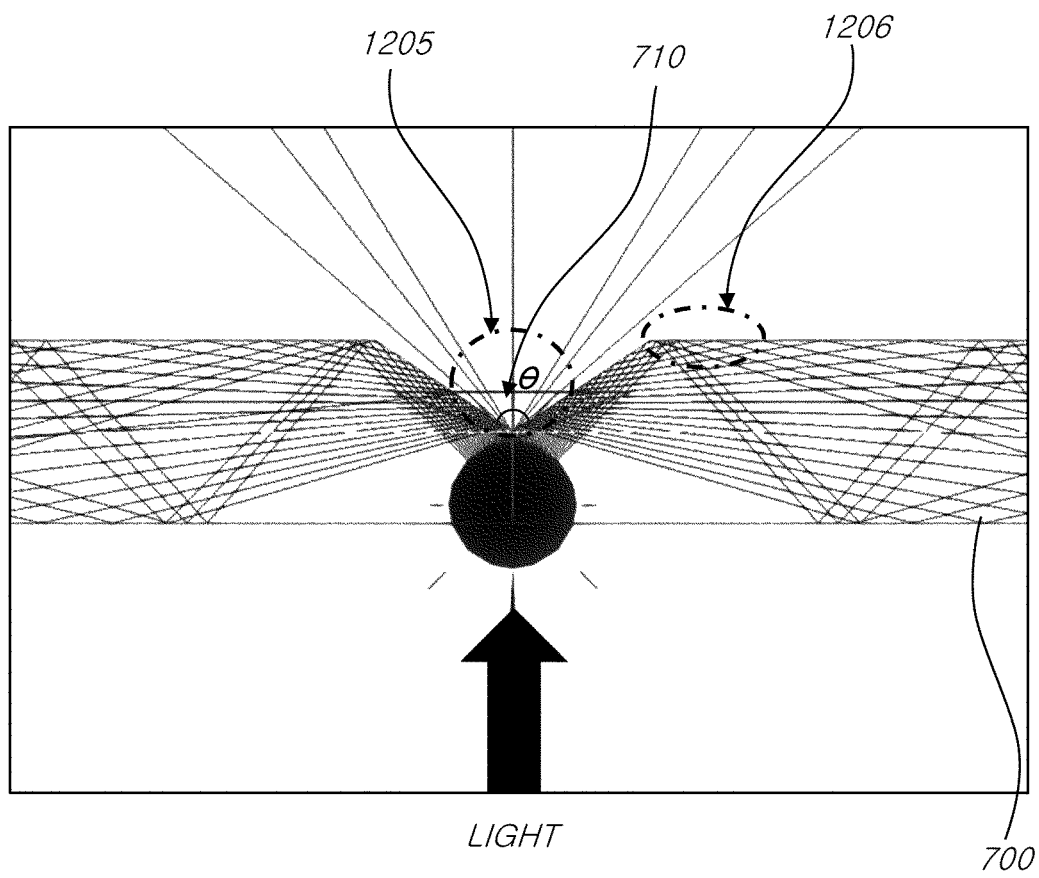
Figure 12D:
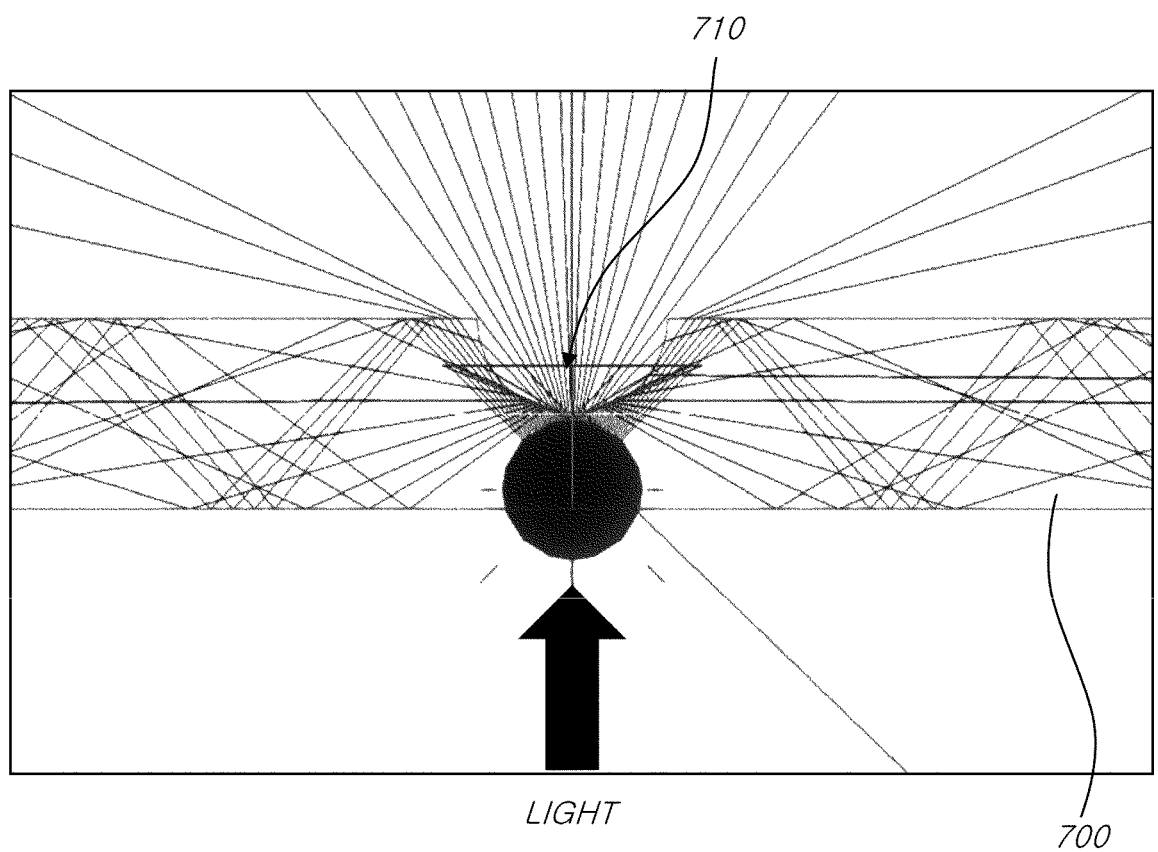
Figure 13A:
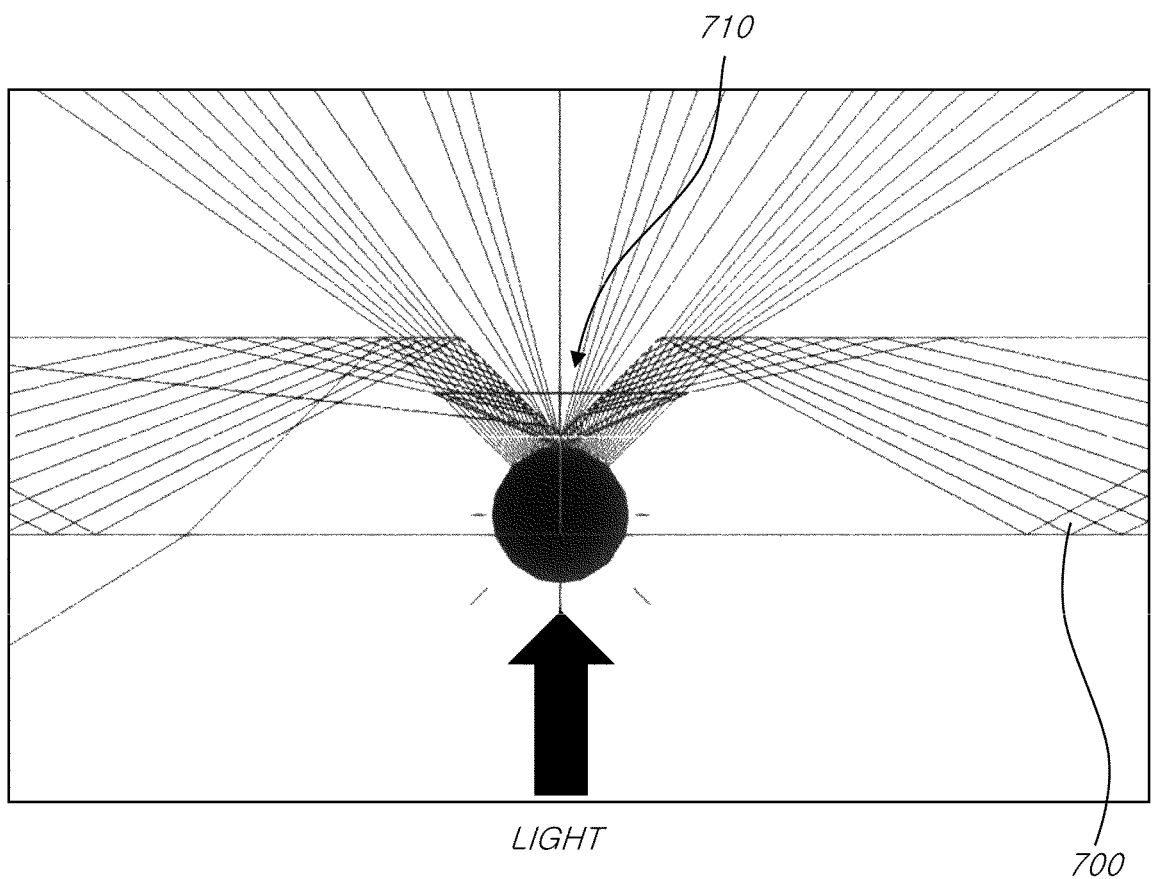
Figure 13B:
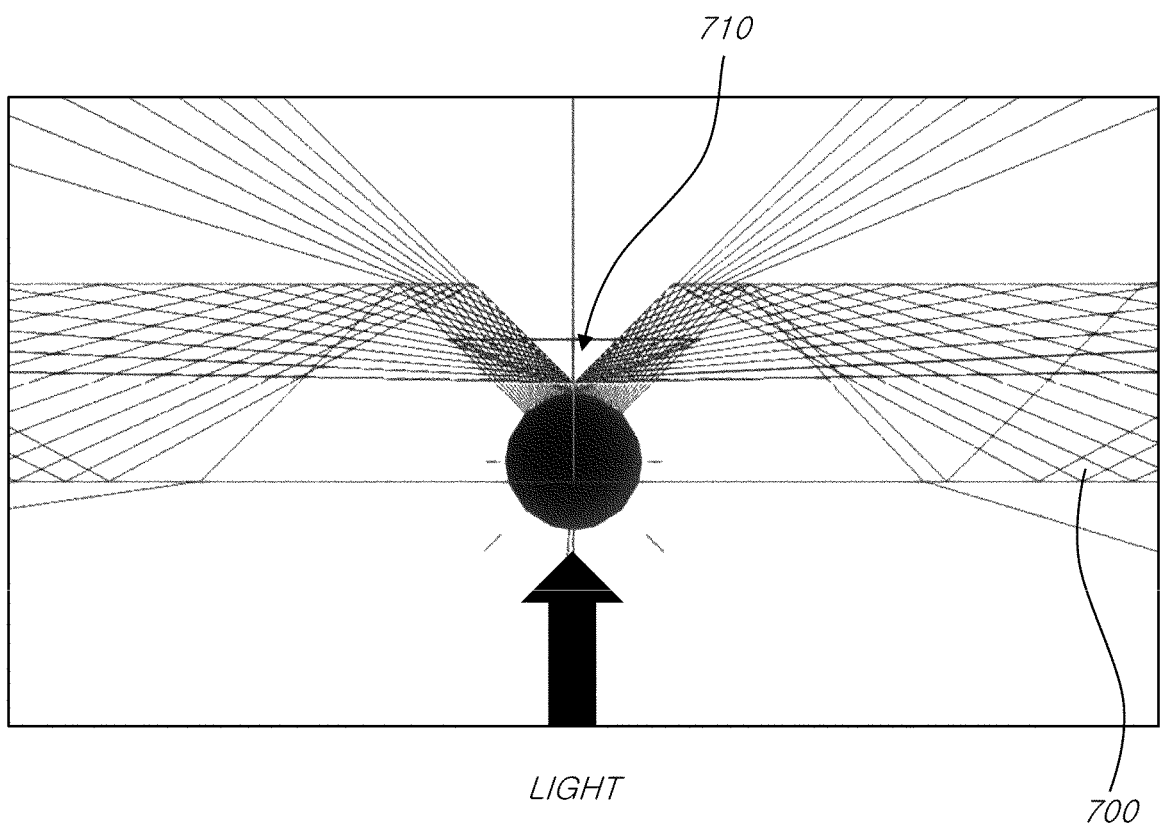
Figure 13C:
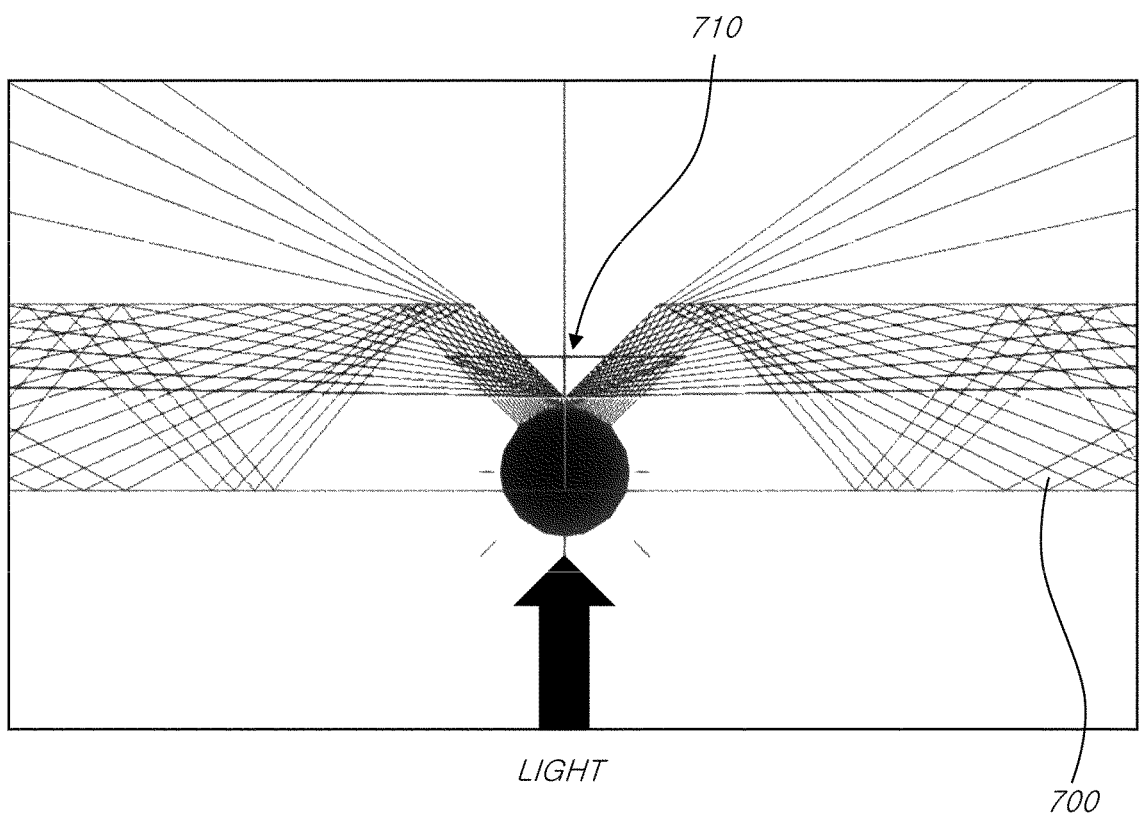

That is, shapes or sizes of the engraved pattern may be variously designed depending on a distance between light sources 240, or intensity of light emitted from the light source 240, a thickness of the light path control element 700, or the like FIGS. 12A to 13C illustrate traveling paths of light according to first engraved patterns of the light path control element 700 according to embodiments of the present disclosure. FIGS. 12A to 12D show traveling paths of light according to shapes of the first engraved patterns 710, and FIGS. 13A to 13C shows traveling paths of light according to a refractive index of a material disposed inside of the first engraved patterns 710.

FIG. 12A shows traveling paths of light reaching the first engraved pattern 710 when an apex angle θ of the first engraved pattern 710 is about 50 degrees. Here, the apex angle may mean an angle measured in a cross section of the first engraved pattern 710.

When the apex angle θ of the first engraved pattern 710 is about 50 degrees, as indicated by 1201, it can be seen that an intensity of light transmitting an area overlapping with the first engraved pattern 710 is significantly reduced. However, as indicated by 1202, it can be seen that a reduction effect of light traveling around the first engraved pattern 710 is relatively small.

FIG. 12B shows traveling paths of light reaching the first engraved pattern 710 when an apex angle θ of the first engraved pattern 710 is about 80 degrees.

When the apex angle θ of the first engraved pattern 710 is about 80 degrees, it can be seen that as indicated by 1203, an effect of blocking light in an area overlapping with the first engraved pattern 710 is relatively big, but as indicated by 1204, a reduction effect of light traveling around the first engraved pattern 710 is relatively small.

FIG. 12C shows traveling paths of light reaching the first engraved pattern 710 when an apex angle θ of the first engraved pattern 710 is about 110 degrees.

That is, FIGS. 12A and 12B represent cases where the apex angle of the first engraved pattern 710 is smaller than the right angle, and FIG. 12C represents a case where the apex angle of the first engraved pattern 710 is greater than the right angle.

When the apex angle θ of the first engraved pattern 710 is about 110 degrees, as indicated by 1205, it can be seen that some of light in an area overlapping with the first engraved pattern 710 can exit the light path control element 700, that is, travels in the upward direction. As indicated by 1206, it can be seen that a reduction effect of light traveling around the first engraved pattern 710 is significantly big.

FIG. 12D shows traveling paths of light when the first engraved pattern 710 has a shape similar to a hemisphere, it can be seen that although a reduction effect of light is produced, the reduction effect is relatively small comparing with the above examples.

Like this, it can be seen that an intensity of light in an area overlapping with the first engraved pattern 710 or an area around the first engraved pattern 710 varies according to a shape, a size, or the like of the first engraved pattern 710.

Accordingly, a shape, a size, or the like of the first engraved pattern 710 can be determined according to a purpose of controlling a traveling path of light, and the structure of the first engraved pattern 710 providing the traveling paths of light shown in FIG. 12C may be suitable for the purpose of diffusing light having the strongest intensity over a light source 240.

FIGS. 13A to 13C show traveling paths of light according to a refractive index of a material disposed inside of the first engraved patterns 710 when an apex angle of the first engraved pattern 710 is about 80 degrees.

FIG. 13A shows traveling paths of light when a material having the refractive index of 1.4 or more, such as PMMA, or the like, is disposed. FIG. 13B shows traveling paths of light when a material having the refractive index of 1.4 or less is disposed. Further, FIG. 13c shows traveling paths of light when air having the refractive index of 1 is disposed.

As shown in FIGS. 13a to 13c, it can be seen that as a material having a smaller refractive index is disposed in the first engraved pattern 710, a reduction effect of the intensity of light reaching the first engraved pattern 710 is bigger.

Accordingly, by disposing one or more other optical elements on the light path control element 700 and in turn, causing air to be filled inside of the first engraved pattern 710, it is possible to enhance light diffusion performance through the first engraved pattern 710.

Further, in some instances, by disposing a light conversion film 300 described above on the light path control element 700, it is possible to enhance an effect of light path control.

Figure 14:
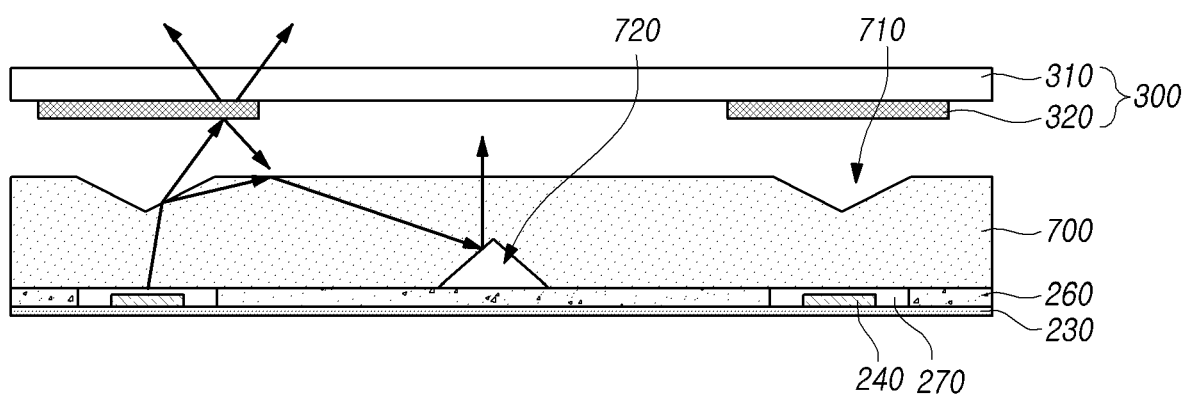
FIG. 14 illustrates further another example of a backlight unit structure according to embodiments of the present disclosure.

FIG. 14 illustrates further another example of a backlight unit structure according to embodiments of the present disclosure.

Referring to FIG. 14, a light source protective element 270 may be disposed on a light source 240, and a reflective plate 260 may be disposed in an area in which the light source is not disposed. Here, the top surface of the light source protective element 270 and the top surface of the reflective plate 260 may be placed on an identical plane.

Further, a light path control element 700 may be disposed on the light source protective element 270 and the reflective plate 260.

The light path control element 700 may include a plurality of first engraved patterns 710 formed on the top surface of the light path control element 700 and located in an area corresponding to the light source 240. Here, the first engraved patterns 710 represents the example of having the apex angle of about 110 degrees among the examples described above.

The light path control element 700 may include a plurality of second engraved patterns 720 formed on the bottom surface of the light path control element 700 and located between light sources 240.

Since the apex angle of the first engraved patterns 710 formed on the top surface of the light path control element 700 is about 110 degrees, a reduction effect of light traveling around the first engraved patterns 710 may be relatively big. Further, some of the light may travel in the upward direction from the first engraved pattern 710.

Here, a light conversion film 300 including light conversion patterns 320 may be disposed on the light path control element 700.

Accordingly, light traveling in the upward direction from the light path control element 700 through the first engraved patterns 710 may reach at least one light conversion patterns 320, and then be reflected, refracted, diffracted, or scattered. Further, some of the light may travel in the upward direction from the light conversion pattern 320.

Like this, while reducing the intensity of light traveling area around the first engraved pattern 710 by configuring the apex angle of the first engraved pattern 710 to be greater than the right angle, by causing paths of light traveling in the upward direction from first engraved pattern 710 to be changed through the light conversion pattern 320, it is therefore possible to effectively diffuse light emitted from the light source 240.

Further, in accordance with embodiments of the present disclosure, by disposing respective different first engraved patterns 710 in an area adjacent to the top surface of the light path control element 700 and in an area adjacent to the inside of the light path control element 700, it is possible to enhance light guide and diffusion functions of the light path control element 700.

Figure 15:
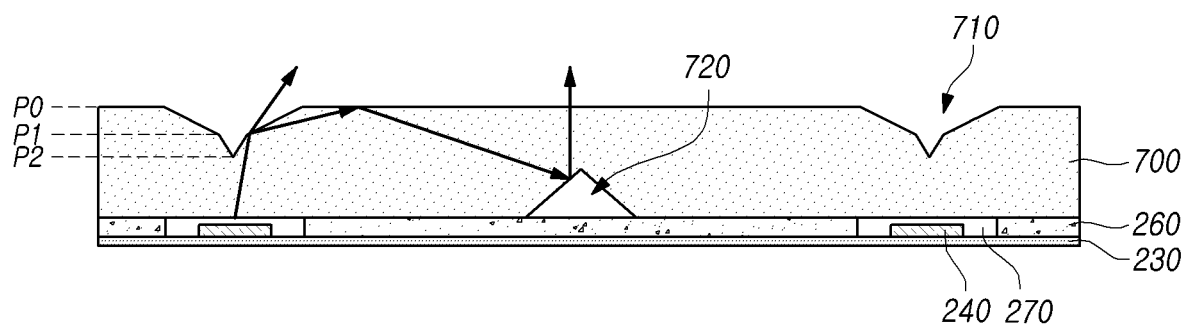
FIG. 15 illustrates further another example of a backlight unit structure according to embodiments of the present disclosure.

FIG. 15 illustrates further another example of a backlight unit structure according to embodiments of the present disclosure.

Referring to FIG. 15, a light source protective element 270, a reflective plate 260, and the like may be disposed over a printed circuit 230 on which a light source 240 is disposed. Further, a light path control element 700 may be disposed on the light source protective element 270 and the reflective plate 260.

The light path control element 700 may include a plurality of first engraved patterns 710 formed on the top surface of the light path control element 700 and located in an area corresponding to the light source 240, and a plurality of second engraved patterns 720 formed on the bottom surface of the light path control element 700 and located between light sources 240.

A width of the first engraved pattern 710 may become smaller from the top surface of the light path control element 700 toward an inner area thereof. A width of the second engraved pattern 720 may become smaller from the bottom surface of the light path control element 700 toward the inner area thereof.

Here, an extent to which the width of the first engraved pattern 710 decreases may be different depending on locations.

For example, when the top surface of the light path control element 700 is a P0 point, a width of the first engraved pattern 710 may decrease at a first ratio from the P0 point toward a P1 point located inside of the light path control element 700. Here, the first ratio may mean an extent to which the width of the first engraved pattern 710 decreases based on a unit depth.

Further, the width of the first engraved pattern 710 may decrease at a second ratio from the P1 point to a P2 point closer to the inner area of the light path control element 700 than the P1 point. Here, the second ratio may be smaller than the first ratio.

That is, the width of the first engraved pattern 710 may decrease at a relatively large ratio from the P0 point toward the P1 point, and decrease at a relatively small ratio from the P1 point toward the P2 point.

Accordingly, an apex angle of the first engraved pattern 710 that can be formed between the P0 point and the P1 point according to a shape of the first engraved pattern 710 may be large, and an apex angle of the first engraved pattern 710 that can be formed between the P1 point and the P2 point according to a shape of the first engraved pattern 710 may be small.

Thus, the intensity of light traveling toward an area overlapping with the first engraved pattern 710 may decrease by a shape of the first engraved pattern 710 between the P1 point and the P2 point forming a small apex angle.

Further, the intensity of light traveling toward an area around the first engraved pattern 710 may decrease by a shape of the first engraved pattern 710 between the P0 point and the P1 point forming a large apex angle.

Figure 16:
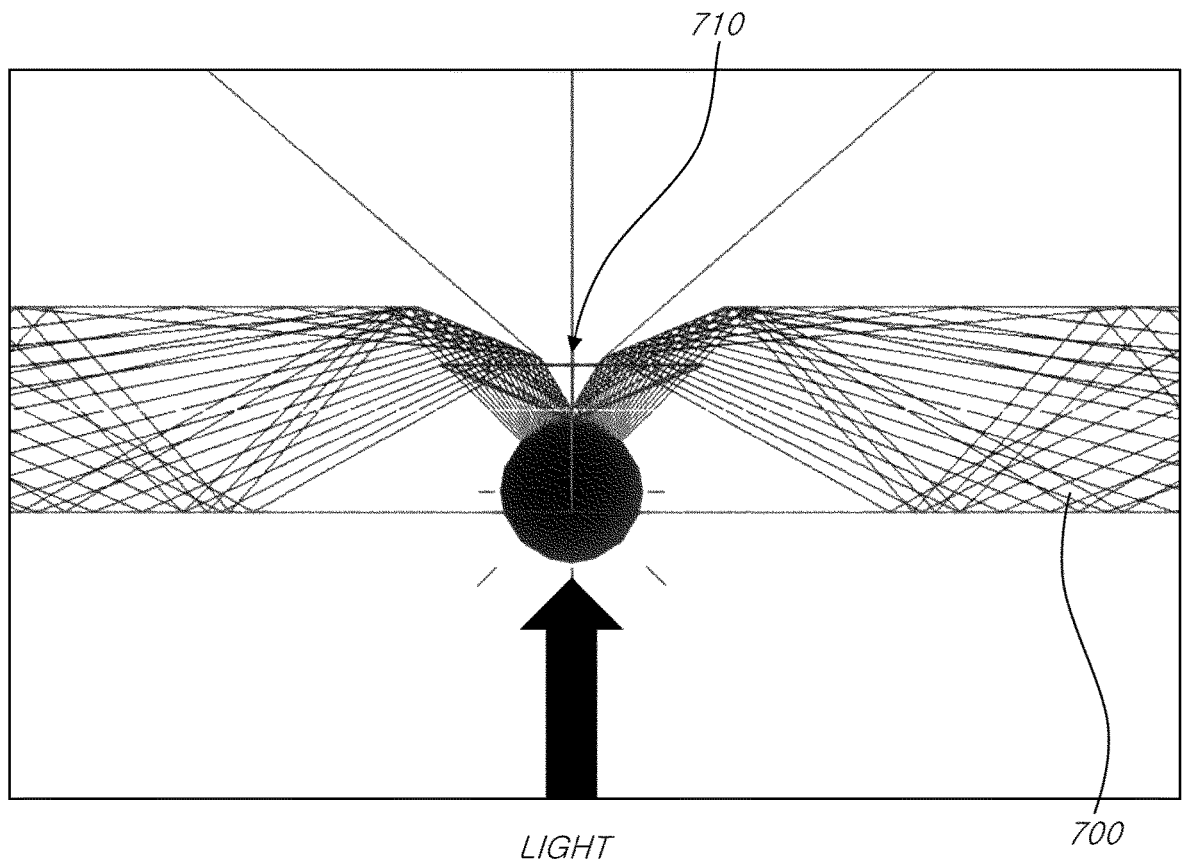
FIG. 16 illustrates traveling paths of light resulted from a light path control element shown in FIG. 15 according to embodiments of the present disclosure.

FIG. 16 illustrates traveling paths of light resulted from the light path control element 700 shown in FIG. 15 according to embodiments of the present disclosure.

Referring to FIG. 16, it can be seen that the intensity of light traveling toward an area overlapping with the first engraved pattern 710 and an area around the first engraved pattern 710 decreases, and light reaching the first engraved pattern 710 is diffused and guided toward the inside of the light path control element 700.

Accordingly, the intensity of light traveling in the upward direction from the first engraved pattern 710 can be reduced, and a hot spot can be prevented from being produced.

The light guided toward the inside of the light path control element 700 after having reached the first engraved pattern 710 may be reflected, refracted, diffracted or scattered, and then, travel toward an area between light sources 240.

Since the second engraved pattern 720 is a structure for providing light in the upward direction from the light path control element 700, a width of the second engraved pattern 720 may uniformly decrease toward the inner area of the light path control element 700.

Further, air may be filled inside of the second engraved pattern 720, or a material having a refractive index smaller than a refractive index of the light path control element 700 may be disposed inside of the second engraved pattern 720.

Figure 17:
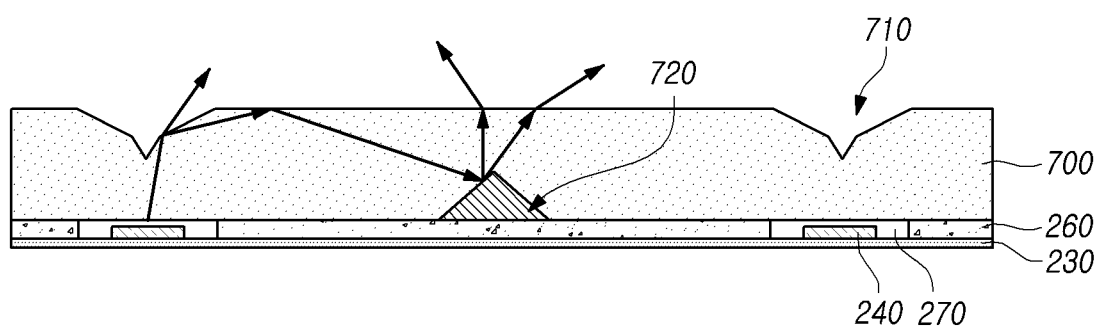
FIG. 17 illustrates further another example of a backlight unit structure according to embodiments of the present disclosure.

FIG. 17 illustrates further another example of a backlight unit structure according to embodiments of the present disclosure.

Referring to FIG. 17, a light source protective element 270 may be disposed on a light source 240, a reflective plate 260 may be disposed in an area in which the light source is not disposed, and a light path control element 700 may be disposed on the reflective plate 260 and the light source protective element 270.

A plurality of first engraved patterns 710 may be disposed on the top surface of the light path control element 700. A plurality of second engraved patterns 720 may be disposed on the bottom surface of the light path control element 700.

Here, a material having a refractive index smaller than a refractive index of the light path control element 700 may be disposed inside of the second engraved patterns 720.

Further, air may be filled inside of the first engraved patterns 710.

Accordingly, the refractive index of the material disposed inside of the second engraved patterns 720 may be greater than the refractive index of the material disposed inside of the first engraved patterns 710, and may be smaller than the refractive index of the light path control element 700.

As described above, air may be present inside of the second engraved patterns 720; however, embodiments of the present disclosure are not limited thereto. For example, the light path control element 700 may be disposed after a material having a shape similar to the second engraved patterns 720 and having a low refractive index has been disposed on the reflective plate 260.

That is, a material disposed inside of the second engraved patterns 720 may be selected from various materials according to methods of manufacturing or disposing the light path control element 700. Further, a size of an apex angle of the second engraved patterns 720 may be determined independently of a size of an apex angle of the first engraved patterns 710.

FIGS. 18A to 18D and 19A to 19C illustrate traveling paths of light according to second engraved patterns 720 of a light path control element 700 according to embodiments of the present disclosure.

Figure 18A:
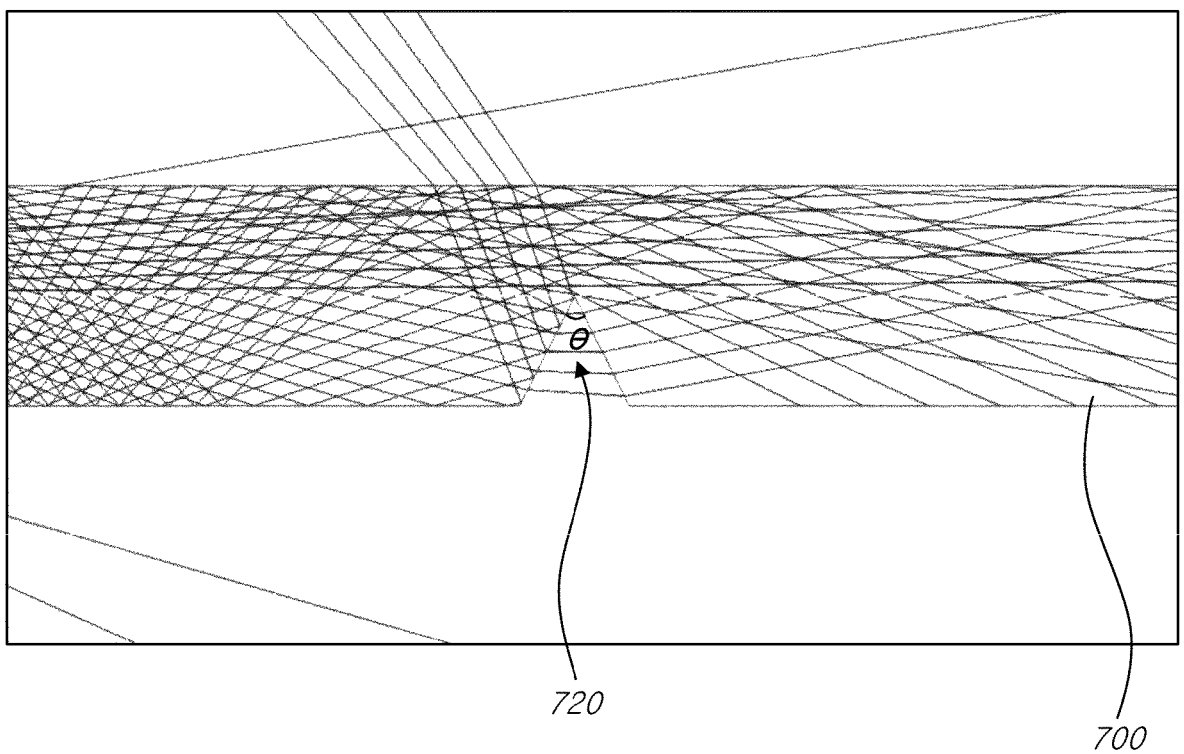
FIGS. 18A to 18D and 19A to 19C illustrate traveling paths of light according to second engraved patterns of the light path control element according to embodiments of the present disclosure.
Figure 18B:
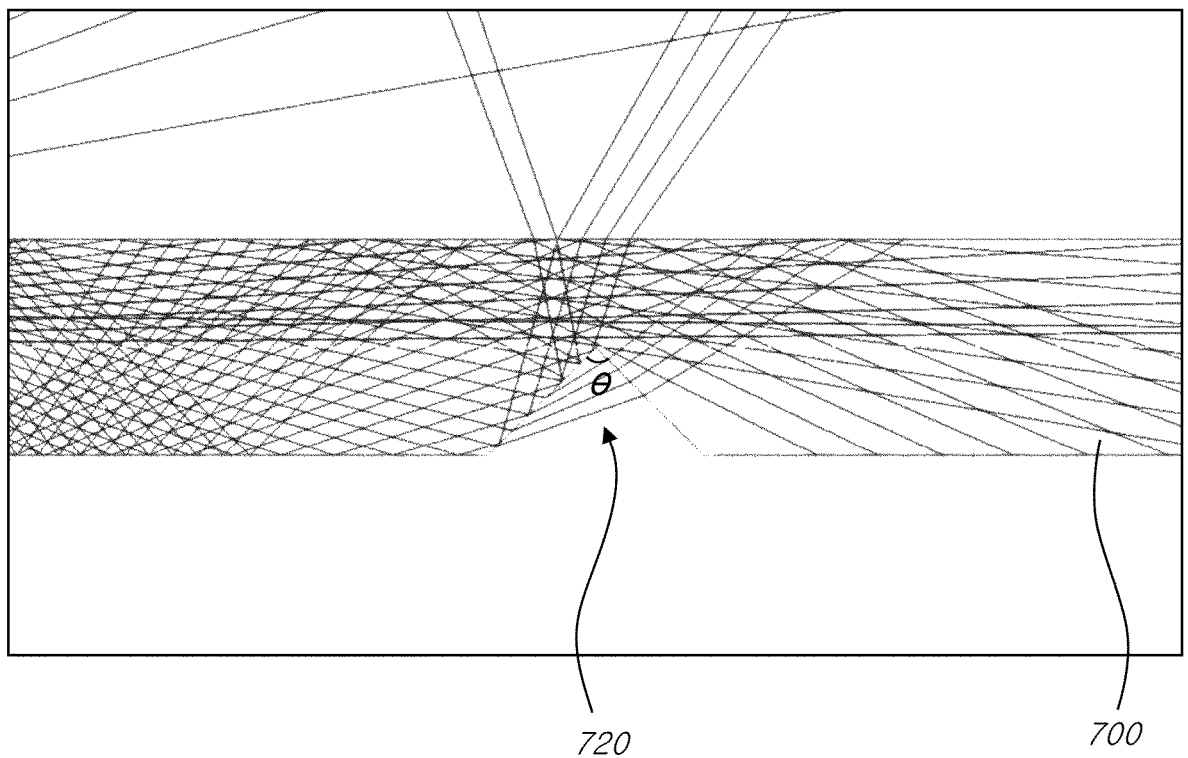
Figure 18C:
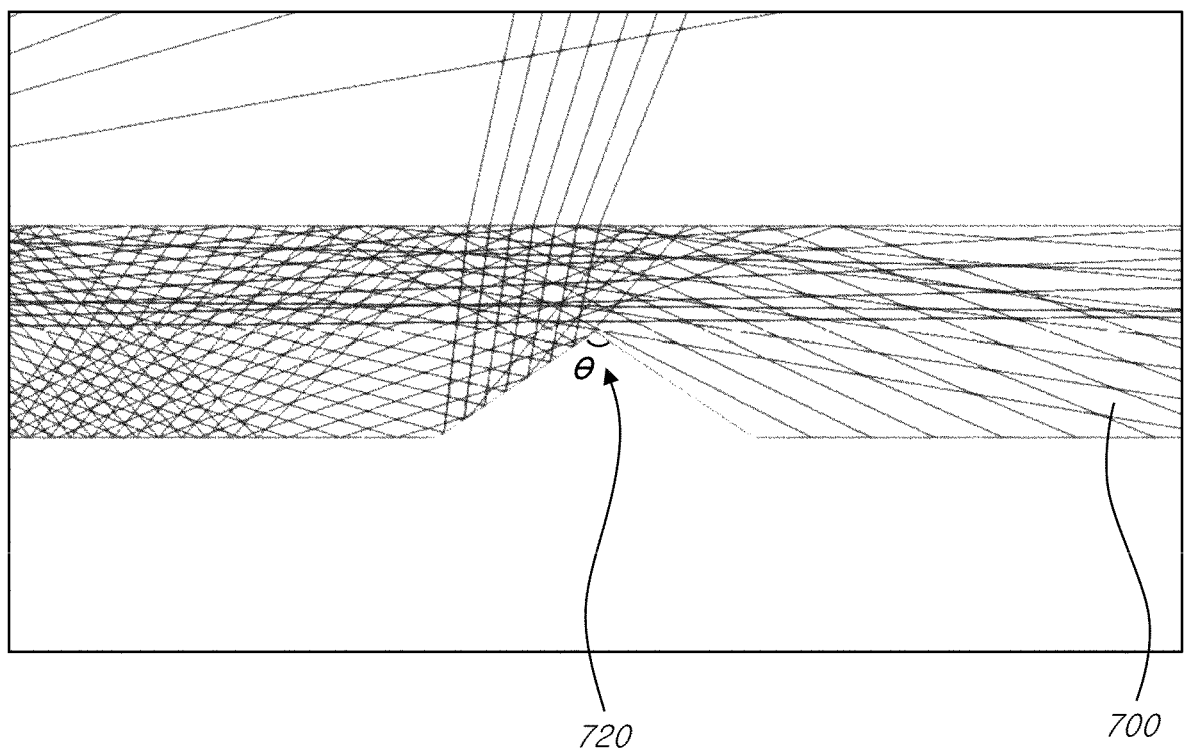
Figure 18D:
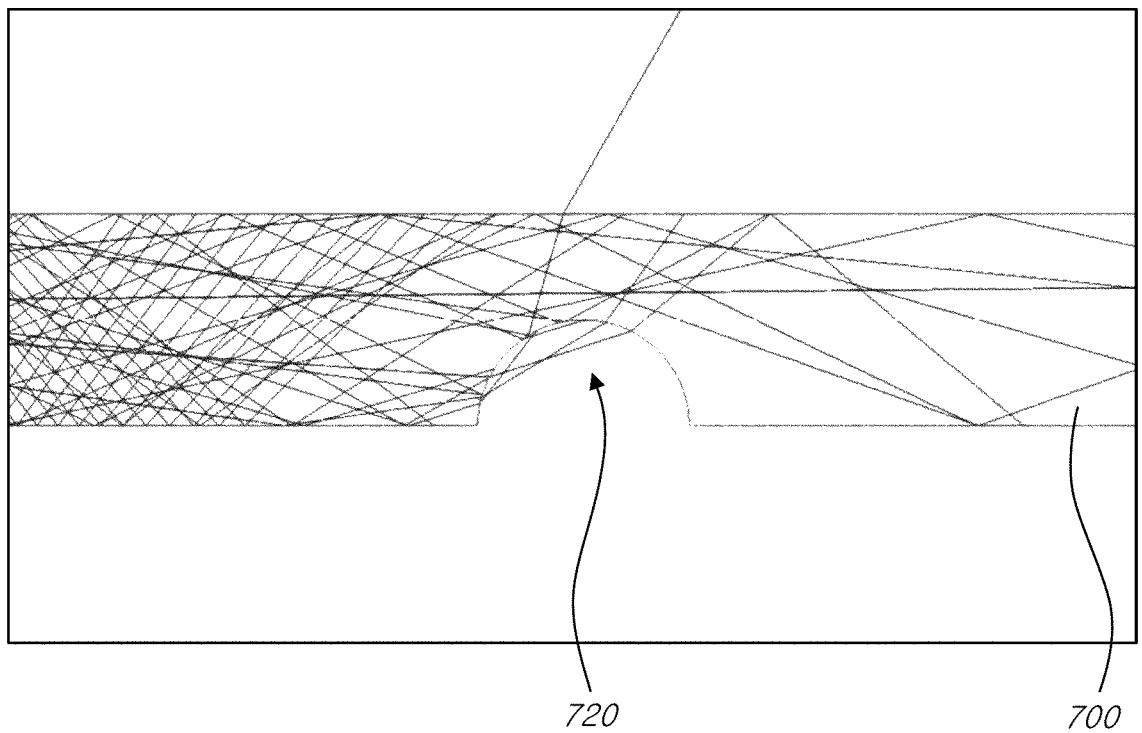
Figure 19A:
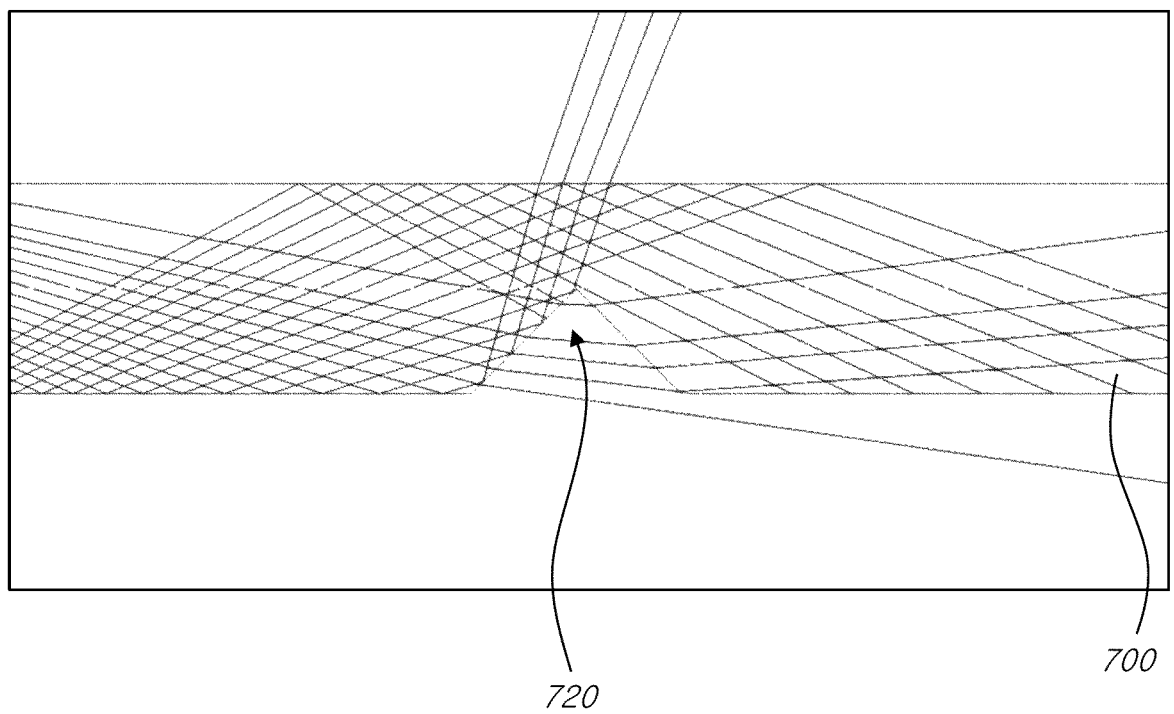
Figure 19B:
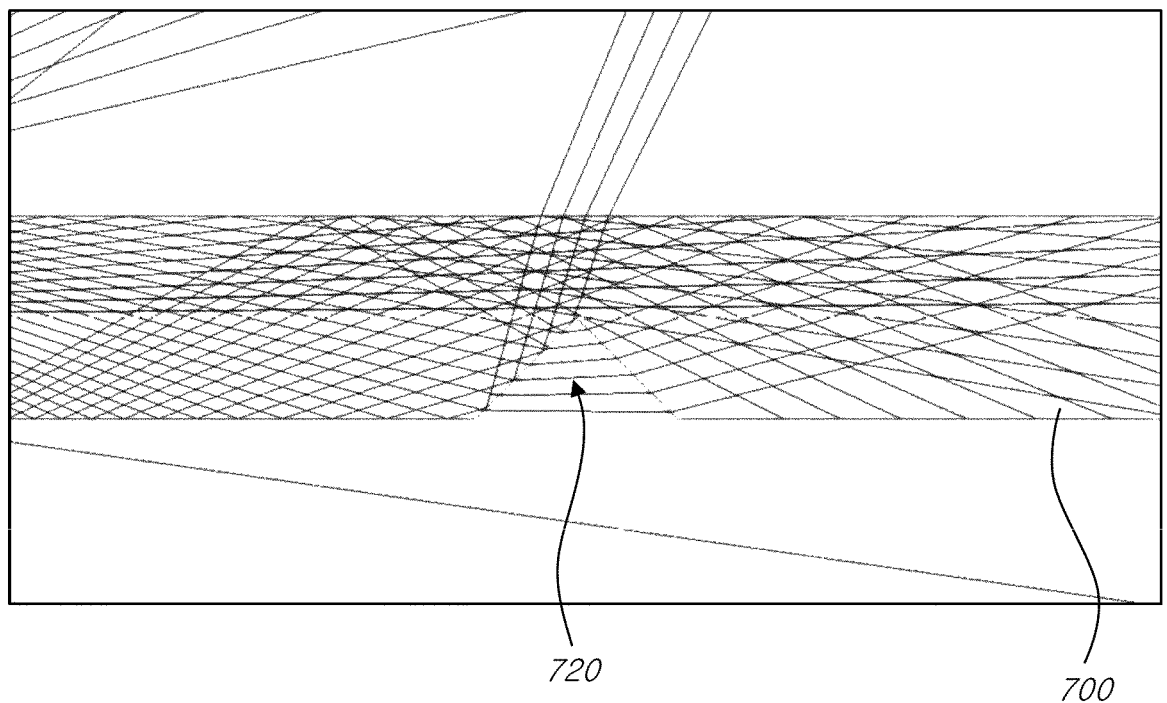
Figure 19C:
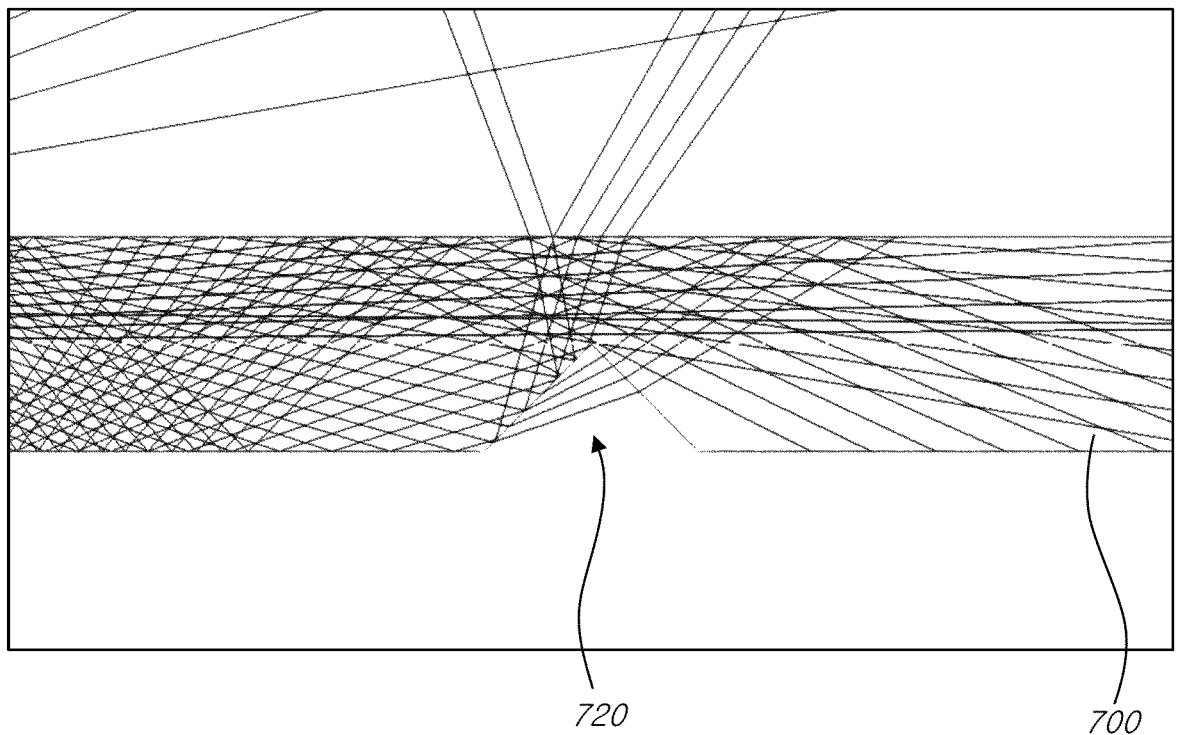

FIGS. 18A to 18D show traveling paths of light according to a shape of the second engraved patterns 720, and FIGS. 19A to 19C shows traveling paths of light according to a refractive index of a material disposed inside of the second engraved patterns 720.

FIG. 18A shows traveling paths of light reaching the second engraved pattern 720 when an apex angle θ of the second engraved pattern 720 is about 50 degrees. FIG. 18B shows traveling paths of light when the apex angle θ of the second engraved pattern 720 is about 80 degrees, and FIG. 18C shows traveling paths of light when the apex angle θ of the second engraved pattern 720 is about 110 degrees. Further, FIG. 18D shows traveling paths of light when the second engraved pattern 720 has a shape similar to a hemisphere, an ellipse, or the like.

As shown in FIGS. 18A to 18D, it can be seen that an effect of causing light to exit is produced by the second engraved pattern 720 in all examples of the second engraved pattern 720. In particular, it can be seen that the effect of causing light to exit is big in structures illustrated in FIGS. 18A to 18C.

Further, FIGS. 19A to 19C show traveling paths of light according to a refractive index of a material disposed inside of the second engraved patterns 720 when the apex angle of the second engraved pattern 720 is about 80 degrees.

FIG. 19A shows traveling paths of light reaching the second engraved pattern 720 when a material having the refractive index of 1.4 or more is disposed inside of the second engraved pattern 720. FIG. 19B shows traveling paths of light when a material having the refractive index of 1.4 or less is disposed inside of the second engraved pattern 720, and FIG. 19C shows traveling paths of light when a material having the refractive index of 1, air, is disposed inside of the second engraved pattern 720.

As shown in FIGS. 19A to 19C, it can be seen that the effect of causing light to exit is improved when a refractive index of a material disposed inside of the second engraved patterns 720 is smaller than a refractive index of the light path control element 700.

Accordingly, a shape of the second engraved patterns 720, a type of material disposed inside of the second engraved patterns 720, or the like may be determined taking account of how such a second engraved patterns 720 can be easily implemented, etc., and may be determined independently of a size of a first engraved pattern 710, or the like.

Such a light path control element 700 may be formed using a solid polymer or the like, and disposed over a light source 240.

Further, the light path control element 700 may be disposed on the light source 240 using a liquid polymer.

FIG. 20 illustrates an example of a method of manufacturing a light path control element 700 according to embodiments of the present disclosure.

Referring to FIG. 20, a reflective plate 260 may be disposed on a printed circuit 230 on which a light source 240 is mounted.

Then, liquid resin may be deposited on the light source 240 and the reflective plate 260.

Here, an element having a refractive index lower than the liquid resin and having the shape of a second engraved pattern 720 may be disposed in advance at a portion in which the second engraved pattern 720 is located. In another example, an element having the shape of the second engraved pattern 720 and including an empty space inside of the element may be disposed.

Like this, by depositing the liquid resin after the element for forming the second engraved pattern 720 is disposed, the second engraved pattern 720 can be easily formed.

Further, in a state where the liquid resin is deposited on the light source 240 and the reflective plate 260, a first engraved pattern 710 can be formed using an embossed mold 2000.

Accordingly, the light path control element 700 including the first engraved pattern 710 and the second engraved pattern 720 can be formed using the liquid resin.

Here, since the liquid resin is deposited on the light source 240 and the reflective plate 260, a light source protective element 270 disposed on the light source 240 can be formed by the liquid resin. That is, a protrusion 701 can be formed on the bottom surface of the light path control element 700, and thus, can replace the light source protective element 270.

In accordance with embodiments of the present disclosure, by disposing light conversion patterns 320 for changing traveling paths of light, or disposing a light conversion film 300 including a light diffusion layer 330 and light diffusion patterns 340 on a light source 240, it is possible to prevent a hot spot from being produced and improve luminance uniformity in a backlight unit.

Alternatively, by disposing a light path control element 700 including a first engraved pattern 710 located to correspond to a light source 240 on a surface which light exits and a second engraved pattern 720 located between light sources 240 on a surface which light enters, it is possible to enhance further the performance of guiding and/or diffusing light upwardly emitted from the light source 240.

Accordingly, by increasing a distance between light sources 240 and enabling a hot spot to be prevented and luminance uniformity to improve, it is possible to reduce the number of light sources 240 included in a backlight unit and provide the backlight unit producing improved image quality.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
    a backlight unit, the backlight unit including:
        a plurality of light sources disposed on a printed circuit; and
        a light path control element located over at least one of the plurality of light sources, the light path control element including:
            a plurality of first engraved patterns each located in an area overlapping with all or at least a part of each of the plurality of light sources on a top surface of the light path control element;
            a plurality of second engraved patterns located in an area except for areas overlapping with the plurality of light sources on a bottom surface of the light path control element; and
            air is present in each of the plurality of first engraved patterns and the plurality of second engraved patterns; and
    a panel disposed over the backlight unit and receiving light from the backlight unit.

2. The display device according to claim 1, wherein a width of the first engraved patterns becomes smaller from the top surface of the light path control element toward an inner area of the light path control element.

3. The display device according to claim 2, wherein a first ratio at which the width of the first engraved patterns decreases based on a unit depth from the top surface of the light path control element toward a first point located inside of the light path control element is different from a second ratio at which the width of the first engraved patterns decreases based on the unit depth from the first point toward a second point closer to the inner area of the light path control element than the first point.

4. The display device according to claim 3, wherein the first ratio is greater than the second ratio.

5. The display device according to claim 1, wherein a width of the second engraved patterns becomes smaller from the bottom surface of the light path control element toward an inner area of the light path control element.

6. The display device according to claim 1, wherein the second engraved patterns are disposed in one or more areas except for areas overlapping with the first engraved patterns.

7. The display device according to claim 1, wherein the refractive index of the air located inside of the second engraved patterns is smaller than a refractive index of the light path control element and greater than or equal to the refractive index of the air located inside of the first engraved patterns.

8. The display device according to claim 1, further comprising a light source protective element located between one or more of the light sources and the light path control element, and the light source protective element having a refractive index identical to a refractive index of the light path control element.

9. The display device according to claim 8, wherein the light path control element and the light source protective element are formed integrally.

10. The display device according to claim 8, further comprising a reflective plate located on the printed circuit and including a plurality of holes located to correspond to the respective light sources,
    wherein the light source protective element is located inside of each of the plurality of holes included in the reflective plate,
    wherein a top surface of the light source protective element and a top surface of the reflective plate are coplanar with each other.

11. The display device according to claim 10, wherein the second engraved patterns are disposed in one or more areas except for areas overlapping with the plurality of holes included in the reflective plate.

12. The display device according to claim 1, further comprising a light conversion film including a plurality of light conversion patterns located on the light path control element, located in an area overlapping with all or at least a part of one or more of the light sources, and causing one or more of traveling paths of incident light to be changed.

13. The display device according to claim 12, wherein each of the light conversion patterns overlaps with all or at least a part of each of the first engraved patterns, and disposed in one or more areas except for areas overlapping with the second engraved patterns.

14. The display device according to claim 1, further comprising a light conversion film including a light diffusion layer located on the light path control element and located on a lower portion of the light conversion film, and a plurality of light diffusion patterns located on an upper portion of the light conversion film.

15. A backlight unit, comprising:
a plurality of light sources disposed on a printed circuit;
a light source protective element located on at least one of the plurality of light sources and surrounding at least a part of an outside surface of the at least one of the plurality of light sources; and
a light conversion film located on and spaced apart from the light source protective element, and including a light diffusion layer disposed on a lower portion of the light conversion film and a plurality of light diffusion patterns disposed on an upper portion of the light conversion film.

16. A backlight unit, comprising:
a plurality of light sources disposed on a printed circuit; and
a light path control element located over at least one of the plurality of light sources, the light path control element including:
a plurality of first engraved patterns each located in an area overlapping with all or at least a part of each of the plurality of light sources on a top surface of the light path control element;
a plurality of second engraved patterns located in an area except for areas overlapping with the plurality of light sources on a bottom surface of the light path control element; and
air included in at least one of a space of the plurality of first engraved patterns and the plurality of second engraved patterns.

17. A light path control element having a first surface and a second surface opposite of the first surface, comprising:
a plurality of first engraved patterns located on the first surface of the light path control element;
a plurality of second engraved patterns located on the second surface of the light path control element, the plurality of second engraved patterns located in one or more areas except for areas overlapping with the first engraved patterns; and
air included in a space of the plurality of first engraved patterns and the plurality of second engraved patterns.

18. The light path control element according to claim 17, wherein a width of the first engraved patterns becomes smaller from the first surface toward an inner area of the light path control element, and a width of the second engraved patterns becomes smaller from the second surface toward the inner area of the light path control element.

19. The light path control element according to claim 18, wherein a first ratio at which the width of the first engraved patterns decreases based on a unit depth from the first surface toward a first point located inside of the light path control element is greater than a second ratio at which the width of the first engraved patterns decreases based on the unit depth from the first point toward a second point closer to the inner area of the light path control element than the first point, and a ratio at which a width of the second engraved patterns decreases based on the unit depth from the second surface toward the inner area of the light path control element is constant.

* * * * *